United States Patent
Wright et al.

(10) Patent No.: US 9,672,238 B2
(45) Date of Patent: Jun. 6, 2017

(54) DYNAMIC FILTER PROCESSING

(71) Applicant: Walleye Software, LLC, Plymouth, MN (US)

(72) Inventors: Charles Wright, Cortlandt Manor, NY (US); Ryan Caudy, New York, NY (US); David R. Kent, IV, Colorado Springs, CO (US); Mark Zeldis, Randolph, NJ (US); Herve Bronnimann, New York, NY (US); Radu Teodorescu, New York, NY (US)

( * ) Notice: Subject to any disclaimer, the term of this patent is extended or adjusted under 35 U.S.C. 154(b) by 0 days.

(21) Appl. No.: 15/154,987

(22) Filed: May 14, 2016

(65) Prior Publication Data
US 2016/0335307 A1    Nov. 17, 2016

Related U.S. Application Data

(60) Provisional application No. 62/161,813, filed on May 14, 2015.

(51) Int. Cl.
*G06F 17/30* (2006.01)
*G06F 3/0482* (2013.01)
(Continued)

(52) U.S. Cl.
CPC ...... *G06F 17/30368* (2013.01); *G06F 3/0481* (2013.01); *G06F 3/0482* (2013.01);
(Continued)

(58) Field of Classification Search
None
See application file for complete search history.

(56) References Cited

U.S. PATENT DOCUMENTS

| 5,335,202 A | 8/1994 | Manning et al. |
| 5,452,434 A | 9/1995 | Macdonald |

(Continued)

FOREIGN PATENT DOCUMENTS

| CA | 2309462 A1 | 12/2000 |
| EP | 1406463 A2 | 4/2004 |

(Continued)

OTHER PUBLICATIONS

"IBM Informix TimeSeries data management", dated Jan. 18, 2016. Retrieved from https://web.archive.org/web/20160118072141/http://www-01.ibm.com/software/data/informix/timeseries/.
(Continued)

*Primary Examiner* — Bai D. Vu
(74) *Attorney, Agent, or Firm* — Carmichael IP, PLLC

(57) ABSTRACT

The disclosed subject matter includes systems, methods, and computer readable medium for automatically updating data source objects (DSO). First and second DSO can be created and mapped to first and second data, respectively. A third DSO can be created and mapped to the first subset of the first stored data by filtering the first stored data mapped to the first DSO with the second stored data mapped to the second DSO. A listener can be created for the third DSO to detect changes to the first DSO. Listener can receive notification of a change to the first DSO. the mapping of the third DSO can be updated by applying the change. A remapping can be requested of the third DSO to a second subset of first stored data by filtering the first stored data mapped to the first DSO with the second stored data mapped to the second DSO.

26 Claims, 6 Drawing Sheets

500 Quotes Received Table

| STOCK SYMBOL 502 | QUOTE DATA 504 | QUOTE TIME 506 | QUOTE 508 |
|---|---|---|---|
| AAPL | 2/17/16 | 9:31 | $95.67 |
| CMI | 2/17/16 | 9:31 | $97.85 |
| SPY | 2/17/16 | 9:31 | $91.02 |
| AAPL | 2/17/16 | 9:32 | $96.20 |
| CMI | 2/17/16 | 9:32 | $96.93 |
| SPY | 2/17/16 | 9:32 | $91.20 |

(51) Int. Cl.

| | | |
|---|---|---|
| *G06F 3/0489* | (2013.01) | |
| *G06F 17/22* | (2006.01) | |
| *G06F 17/24* | (2006.01) | |
| *G06F 17/27* | (2006.01) | |
| *G06F 12/084* | (2016.01) | |
| *H04L 12/58* | (2006.01) | |
| *G06F 15/173* | (2006.01) | |
| *G06F 3/0481* | (2013.01) | |
| *G06F 3/0484* | (2013.01) | |
| *G06F 3/0485* | (2013.01) | |
| *G06F 12/02* | (2006.01) | |
| *G06F 9/44* | (2006.01) | |
| *G06F 9/45* | (2006.01) | |
| *H04L 29/08* | (2006.01) | |
| *G06F 3/06* | (2006.01) | |
| *G06F 11/14* | (2006.01) | |
| *H04L 29/06* | (2006.01) | |
| *G06F 9/445* | (2006.01) | |
| *H04L 12/18* | (2006.01) | |
| *H04L 29/12* | (2006.01) | |

(52) U.S. Cl.
CPC ........ *G06F 3/0485* (2013.01); *G06F 3/04847* (2013.01); *G06F 3/04895* (2013.01); *G06F 3/0605* (2013.01); *G06F 3/067* (2013.01); *G06F 3/0656* (2013.01); *G06F 8/30* (2013.01); *G06F 8/41* (2013.01); *G06F 8/427* (2013.01); *G06F 8/60* (2013.01); *G06F 11/1451* (2013.01); *G06F 11/1464* (2013.01); *G06F 11/1469* (2013.01); *G06F 12/0261* (2013.01); *G06F 12/084* (2013.01); *G06F 15/17331* (2013.01); *G06F 17/2235* (2013.01); *G06F 17/24* (2013.01); *G06F 17/246* (2013.01); *G06F 17/276* (2013.01); *G06F 17/2715* (2013.01); *G06F 17/30117* (2013.01); *G06F 17/30312* (2013.01); *G06F 17/30315* (2013.01); *G06F 17/30321* (2013.01); *G06F 17/30324* (2013.01); *G06F 17/30327* (2013.01); *G06F 17/30333* (2013.01); *G06F 17/30336* (2013.01); *G06F 17/30339* (2013.01); *G06F 17/30345* (2013.01); *G06F 17/30371* (2013.01); *G06F 17/30374* (2013.01); *G06F 17/30377* (2013.01); *G06F 17/30398* (2013.01); *G06F 17/30424* (2013.01); *G06F 17/30448* (2013.01); *G06F 17/30454* (2013.01); *G06F 17/30477* (2013.01); *G06F 17/30522* (2013.01); *G06F 17/30528* (2013.01); *G06F 17/30554* (2013.01); *G06F 17/30563* (2013.01); *G06F 17/30584* (2013.01); *G06F 17/30598* (2013.01); *G06F 17/30864* (2013.01); *G06F 17/30867* (2013.01); *G06F 17/30887* (2013.01); *G06F 17/30958* (2013.01); *G06F 17/30997* (2013.01); *H04L 12/18* (2013.01); *H04L 51/12* (2013.01); *H04L 61/2069* (2013.01); *H04L 63/101* (2013.01); *H04L 63/102* (2013.01); *H04L 67/1002* (2013.01); *H04L 67/34* (2013.01); *H04L 67/42* (2013.01); *H04L 69/16* (2013.01); *G06F 2201/805* (2013.01); *G06F 2201/84* (2013.01); *G06F 2212/60* (2013.01)

(56) References Cited

U.S. PATENT DOCUMENTS

| | | |
|---|---|---|
| 5,469,567 A | 11/1995 | Okada |
| 5,504,885 A | 4/1996 | Alashqur |
| 5,530,939 A | 6/1996 | Mansfield et al. |
| 5,568,632 A | 10/1996 | Nelson |
| 5,673,369 A | 9/1997 | Kim |
| 5,701,461 A | 12/1997 | Dalal et al. |
| 5,701,467 A | 12/1997 | Freeston |
| 5,764,953 A | 6/1998 | Collins et al. |
| 5,787,428 A | 7/1998 | Hart |
| 5,806,059 A | 9/1998 | Tsuchida et al. |
| 5,859,972 A | 1/1999 | Subramaniam et al. |
| 5,875,334 A | 2/1999 | Chow et al. |
| 5,878,415 A | 3/1999 | Olds |
| 5,890,167 A | 3/1999 | Bridge et al. |
| 5,899,990 A | 5/1999 | Maritzen et al. |
| 5,920,860 A | 7/1999 | Maheshwari et al. |
| 5,943,672 A | 8/1999 | Yoshida |
| 5,960,087 A | 9/1999 | Tribble et al. |
| 5,991,810 A | 11/1999 | Shapiro et al. |
| 5,999,918 A | 12/1999 | Williams et al. |
| 6,006,220 A | 12/1999 | Haderle et al. |
| 6,032,144 A | 2/2000 | Srivastava et al. |
| 6,032,148 A | 2/2000 | Wilkes |
| 6,038,563 A | 3/2000 | Bapat et al. |
| 6,058,394 A | 5/2000 | Bakow et al. |
| 6,061,684 A | 5/2000 | Glasser et al. |
| 6,138,112 A | 10/2000 | Slutz |
| 6,266,669 B1 | 7/2001 | Brodersen et al. |
| 6,289,357 B1 | 9/2001 | Parker |
| 6,292,803 B1 | 9/2001 | Richardson et al. |
| 6,304,876 B1 | 10/2001 | Isip |
| 6,317,728 B1 | 11/2001 | Kane |
| 6,327,702 B1 | 12/2001 | Sauntry et al. |
| 6,336,114 B1 | 1/2002 | Garrison |
| 6,353,819 B1 | 3/2002 | Edwards et al. |
| 6,367,068 B1 | 4/2002 | Vaidyanathan et al. |
| 6,389,414 B1 | 5/2002 | Delo et al. |
| 6,389,462 B1 | 5/2002 | Cohen et al. |
| 6,438,537 B1 | 8/2002 | Netz et al. |
| 6,446,069 B1 | 9/2002 | Yaung et al. |
| 6,460,037 B1 | 10/2002 | Weiss et al. |
| 6,473,750 B1 | 10/2002 | Petculescu et al. |
| 6,487,552 B1 | 11/2002 | Lei et al. |
| 6,496,833 B1 | 12/2002 | Goldberg et al. |
| 6,505,189 B1 | 1/2003 | On Au et al. |
| 6,505,241 B2 | 1/2003 | Pitts |
| 6,510,551 B1 | 1/2003 | Miller |
| 6,530,075 B1 | 3/2003 | Beadle et al. |
| 6,538,651 B1 | 3/2003 | Hayman et al. |
| 6,546,402 B1 | 4/2003 | Beyer et al. |
| 6,553,375 B1 | 4/2003 | Huang et al. |
| 6,584,474 B1 | 6/2003 | Pereira |
| 6,604,104 B1 | 8/2003 | Smith |
| 6,618,720 B1 | 9/2003 | On Au et al. |
| 6,631,374 B1 | 10/2003 | Klein et al. |
| 6,640,234 B1 | 10/2003 | Coffen et al. |
| 6,697,880 B1 | 2/2004 | Dougherty |
| 6,701,415 B1 | 3/2004 | Hendren |
| 6,714,962 B1 | 3/2004 | Helland et al. |
| 6,725,243 B2 | 4/2004 | Snapp |
| 6,732,100 B1 | 5/2004 | Brodersen et al. |
| 6,745,332 B1 | 6/2004 | Wong et al. |
| 6,748,374 B1 | 6/2004 | Madan et al. |
| 6,748,455 B1* | 6/2004 | Hinson ............... G06F 9/542 719/318 |
| 6,760,719 B1 | 7/2004 | Hanson et al. |
| 6,775,660 B2 | 8/2004 | Lin et al. |
| 6,785,668 B1 | 8/2004 | Polo et al. |
| 6,795,851 B1 | 9/2004 | Noy |
| 6,816,855 B2 | 11/2004 | Hartel et al. |
| 6,820,082 B1 | 11/2004 | Cook et al. |
| 6,829,620 B2 | 12/2004 | Hsing et al. |
| 6,832,229 B2 | 12/2004 | Reed |
| 6,851,088 B1 | 2/2005 | Conner et al. |
| 6,882,994 B2 | 4/2005 | Yoshimura et al. |

(56) References Cited

U.S. PATENT DOCUMENTS

| | | |
|---|---|---|
| 6,925,472 B2 | 8/2005 | Kong |
| 6,934,717 B1 | 8/2005 | James |
| 6,947,928 B2 | 9/2005 | Dettinger et al. |
| 6,983,291 B1 | 1/2006 | Cochrane et al. |
| 6,985,895 B2 | 1/2006 | Witkowski et al. |
| 6,985,899 B2 | 1/2006 | Chan et al. |
| 6,985,904 B1 | 1/2006 | Kaluskar et al. |
| 7,020,649 B2 | 3/2006 | Cochrane et al. |
| 7,024,414 B2 | 4/2006 | Sah et al. |
| 7,031,962 B2 | 4/2006 | Moses |
| 7,058,657 B1 | 6/2006 | Berno |
| 7,089,228 B2 | 8/2006 | Arnold et al. |
| 7,089,245 B1 | 8/2006 | George et al. |
| 7,096,216 B2 | 8/2006 | Anonsen |
| 7,103,608 B1 | 9/2006 | Ozbutun et al. |
| 7,110,997 B1 | 9/2006 | Turkel et al. |
| 7,127,462 B2 | 10/2006 | Hiraga et al. |
| 7,146,357 B2 | 12/2006 | Suzuki et al. |
| 7,149,742 B1 | 12/2006 | Eastham et al. |
| 7,167,870 B2 | 1/2007 | Avvari et al. |
| 7,171,469 B2 | 1/2007 | Ackaouy et al. |
| 7,174,341 B2 | 2/2007 | Ghukasyan et al. |
| 7,181,686 B1 | 2/2007 | Bahrs |
| 7,188,105 B2 | 3/2007 | Dettinger et al. |
| 7,200,620 B2 | 4/2007 | Gupta |
| 7,216,115 B1 | 5/2007 | Walters et al. |
| 7,216,116 B1 | 5/2007 | Nilsson et al. |
| 7,225,189 B1 | 5/2007 | McCormack et al. |
| 7,254,808 B2 | 8/2007 | Trappen et al. |
| 7,257,689 B1 | 8/2007 | Baird |
| 7,272,605 B1 | 9/2007 | Hinshaw et al. |
| 7,308,580 B2 | 12/2007 | Nelson et al. |
| 7,316,003 B1 | 1/2008 | Dulepet et al. |
| 7,330,969 B2 | 2/2008 | Harrison et al. |
| 7,333,941 B1 | 2/2008 | Choi |
| 7,343,585 B1 | 3/2008 | Lau et al. |
| 7,350,237 B2 | 3/2008 | Vogel et al. |
| 7,380,242 B2 | 5/2008 | Alaluf |
| 7,401,088 B2 | 7/2008 | Chintakayala et al. |
| 7,426,521 B2 | 9/2008 | Harter |
| 7,430,549 B2 | 9/2008 | Zane et al. |
| 7,433,863 B2 | 10/2008 | Zane et al. |
| 7,447,865 B2 | 11/2008 | Uppala et al. |
| 7,478,094 B2 | 1/2009 | Ho et al. |
| 7,484,096 B1 | 1/2009 | Garg et al. |
| 7,493,311 B1 | 2/2009 | Cutsinger et al. |
| 7,529,734 B2 | 5/2009 | Dirisala |
| 7,529,750 B2 | 5/2009 | Bair |
| 7,610,351 B1 | 10/2009 | Gollapudi et al. |
| 7,620,687 B2 | 11/2009 | Chen et al. |
| 7,624,126 B2 | 11/2009 | Pizzo et al. |
| 7,661,141 B2 | 2/2010 | Dutta et al. |
| 7,664,778 B2 | 2/2010 | Yagoub et al. |
| 7,680,782 B2 | 3/2010 | Chen et al. |
| 7,711,716 B2 | 5/2010 | Stonecipher |
| 7,711,740 B2 | 5/2010 | Minore et al. |
| 7,761,444 B2 | 7/2010 | Zhang et al. |
| 7,797,356 B2 | 9/2010 | Iyer et al. |
| 7,827,204 B2 | 11/2010 | Heinzel et al. |
| 7,827,403 B2 | 11/2010 | Wong et al. |
| 7,827,523 B2 | 11/2010 | Ahmed et al. |
| 7,882,121 B2 | 2/2011 | Bruno et al. |
| 7,882,132 B2 | 2/2011 | Ghatare |
| 7,904,487 B2 | 3/2011 | Ghatare |
| 7,908,259 B2 | 3/2011 | Branscome et al. |
| 7,908,266 B2 | 3/2011 | Zeringue et al. |
| 7,930,412 B2 | 4/2011 | Yeap et al. |
| 7,966,311 B2 | 6/2011 | Haase |
| 7,966,312 B2 | 6/2011 | Nolan et al. |
| 7,966,343 B2 | 6/2011 | Yang et al. |
| 7,970,777 B2 | 6/2011 | Saxena et al. |
| 7,979,431 B2 | 7/2011 | Qazi et al. |
| 7,984,043 B1 | 7/2011 | Waas |
| 8,019,795 B2 | 9/2011 | Anderson et al. |
| 8,032,525 B2 | 10/2011 | Bowers et al. |
| 8,037,542 B2 | 10/2011 | Taylor et al. |
| 8,046,394 B1 | 10/2011 | Shatdal |
| 8,046,749 B1 | 10/2011 | Owen et al. |
| 8,055,672 B2 | 11/2011 | Djugash et al. |
| 8,060,484 B2 | 11/2011 | Bandera et al. |
| 8,171,018 B2 | 5/2012 | Zane et al. |
| 8,180,789 B1 | 5/2012 | Wasserman et al. |
| 8,196,121 B2 | 6/2012 | Peshansky et al. |
| 8,209,356 B1 | 6/2012 | Roesler |
| 8,286,189 B2 | 10/2012 | Kukreja et al. |
| 8,321,833 B2 | 11/2012 | Langworthy et al. |
| 8,332,435 B2 | 12/2012 | Ballard et al. |
| 8,359,305 B1 | 1/2013 | Burke et al. |
| 8,375,127 B1 | 2/2013 | Lita |
| 8,380,757 B1 | 2/2013 | Bailey et al. |
| 8,418,142 B2 | 4/2013 | Ao et al. |
| 8,433,701 B2 | 4/2013 | Sargeant et al. |
| 8,458,218 B2 | 6/2013 | Wildermuth |
| 8,473,897 B2 | 6/2013 | Box et al. |
| 8,478,713 B2 | 7/2013 | Cotner et al. |
| 8,515,942 B2 | 8/2013 | Marum et al. |
| 8,543,620 B2 | 9/2013 | Ching |
| 8,553,028 B1 | 10/2013 | Urbach |
| 8,555,263 B2 | 10/2013 | Allen et al. |
| 8,560,502 B2 | 10/2013 | Vora |
| 8,595,151 B2 | 11/2013 | Hao et al. |
| 8,601,016 B2 | 12/2013 | Briggs et al. |
| 8,631,034 B1 | 1/2014 | Peloski |
| 8,650,182 B2 | 2/2014 | Murthy |
| 8,660,869 B2 | 2/2014 | Macintyre et al. |
| 8,676,863 B1 | 3/2014 | Connell et al. |
| 8,683,488 B2 | 3/2014 | Kukreja et al. |
| 8,713,518 B2 | 4/2014 | Pointer et al. |
| 8,719,252 B2 | 5/2014 | Miranker et al. |
| 8,725,707 B2 | 5/2014 | Chen et al. |
| 8,726,254 B2 | 5/2014 | Rohde et al. |
| 8,745,014 B2 | 6/2014 | Travis |
| 8,745,510 B2 | 6/2014 | D'Alo' et al. |
| 8,751,823 B2 | 6/2014 | Myles et al. |
| 8,768,961 B2 | 7/2014 | Krishnamurthy |
| 8,793,243 B2 | 7/2014 | Weyerhaeuser et al. |
| 8,805,947 B1 | 8/2014 | Kuzkin et al. |
| 8,806,133 B2 | 8/2014 | Hay et al. |
| 8,812,625 B1 | 8/2014 | Chitilian et al. |
| 8,838,656 B1 | 9/2014 | Cheriton |
| 8,855,999 B1 | 10/2014 | Elliot |
| 8,863,156 B1 | 10/2014 | Lepanto et al. |
| 8,874,512 B2 | 10/2014 | Jin et al. |
| 8,880,569 B2 | 11/2014 | Draper et al. |
| 8,880,787 B1 | 11/2014 | Kimmel et al. |
| 8,881,121 B2 | 11/2014 | Ali |
| 8,886,631 B2 | 11/2014 | Abadi et al. |
| 8,903,717 B2 | 12/2014 | Elliot |
| 8,903,842 B2 | 12/2014 | Bloesch et al. |
| 8,922,579 B2 | 12/2014 | Mi et al. |
| 8,924,384 B2 | 12/2014 | Driesen et al. |
| 8,930,892 B2 | 1/2015 | Pointer et al. |
| 8,954,418 B2 | 2/2015 | Faerber et al. |
| 8,959,495 B2 | 2/2015 | Chafi et al. |
| 8,996,864 B2 | 3/2015 | Maigne et al. |
| 9,031,930 B2 | 5/2015 | Valentin |
| 9,077,611 B2 | 7/2015 | Cordray et al. |
| 9,195,712 B2 | 11/2015 | Freedman et al. |
| 9,298,768 B2 | 3/2016 | Varakin et al. |
| 9,372,671 B2 | 6/2016 | Balan et al. |
| 9,384,184 B2 | 7/2016 | Cervantes et al. |
| 2002/0002576 A1 | 1/2002 | Wollrath et al. |
| 2002/0007331 A1 | 1/2002 | Lo et al. |
| 2002/0054587 A1 | 5/2002 | Baker et al. |
| 2002/0065981 A1 | 5/2002 | Jenne et al. |
| 2002/0156722 A1 | 10/2002 | Greenwood |
| 2003/0004952 A1 | 1/2003 | Nixon et al. |
| 2003/0061216 A1 | 3/2003 | Moses |
| 2003/0074400 A1 | 4/2003 | Brooks et al. |
| 2003/0110416 A1 | 6/2003 | Morrison et al. |
| 2003/0167261 A1 | 9/2003 | Grust et al. |
| 2003/0182261 A1 | 9/2003 | Patterson |
| 2003/0208505 A1* | 11/2003 | Mullins ............ G06F 17/30607 |
| 2003/0233632 A1 | 12/2003 | Aigen et al. |

(56) References Cited

U.S. PATENT DOCUMENTS

| | | |
|---|---|---|
| 2004/0002961 A1 | 1/2004 | Dettinger et al. |
| 2004/0111492 A1 | 6/2004 | Nakahara et al. |
| 2004/0148630 A1 | 7/2004 | Choi |
| 2004/0186813 A1 | 9/2004 | Tedesco et al. |
| 2004/0216150 A1 | 10/2004 | Scheifler et al. |
| 2004/0220923 A1 | 11/2004 | Nica |
| 2004/0254876 A1 | 12/2004 | Coval et al. |
| 2005/0015490 A1 | 1/2005 | Saare et al. |
| 2005/0060693 A1 | 3/2005 | Robison et al. |
| 2005/0097447 A1 | 5/2005 | Serra et al. |
| 2005/0102284 A1 | 5/2005 | Srinivasan et al. |
| 2005/0102636 A1 | 5/2005 | McKeon et al. |
| 2005/0131893 A1 | 6/2005 | Von Glan |
| 2005/0132384 A1 | 6/2005 | Morrison et al. |
| 2005/0138624 A1 | 6/2005 | Morrison et al. |
| 2005/0165866 A1 | 7/2005 | Bohannon et al. |
| 2005/0198001 A1 | 9/2005 | Cunningham et al. |
| 2006/0074901 A1 | 4/2006 | Pirahesh et al. |
| 2006/0085490 A1 | 4/2006 | Baron et al. |
| 2006/0100989 A1 | 5/2006 | Chinchwadkar et al. |
| 2006/0101019 A1 | 5/2006 | Nelson et al. |
| 2006/0116983 A1 | 6/2006 | Dettinger et al. |
| 2006/0116999 A1 | 6/2006 | Dettinger et al. |
| 2006/0136361 A1 | 6/2006 | Peri et al. |
| 2006/0173693 A1 | 8/2006 | Arazi et al. |
| 2006/0195460 A1 | 8/2006 | Nori et al. |
| 2006/0212847 A1 | 9/2006 | Tarditi et al. |
| 2006/0218123 A1 | 9/2006 | Chowdhuri et al. |
| 2006/0218200 A1 | 9/2006 | Factor et al. |
| 2006/0230016 A1 | 10/2006 | Cunningham et al. |
| 2006/0271510 A1 | 11/2006 | Harward et al. |
| 2006/0277162 A1 | 12/2006 | Smith |
| 2007/0011211 A1 | 1/2007 | Reeves et al. |
| 2007/0033518 A1 | 2/2007 | Kenna et al. |
| 2007/0073765 A1 | 3/2007 | Chen |
| 2007/0101252 A1 | 5/2007 | Chamberlain et al. |
| 2007/0169003 A1 | 7/2007 | Branda et al. |
| 2007/0256060 A1 | 11/2007 | Ryu et al. |
| 2007/0258508 A1 | 11/2007 | Werb et al. |
| 2007/0271280 A1 | 11/2007 | Chandasekaran |
| 2007/0299822 A1 | 12/2007 | Jopp et al. |
| 2008/0022136 A1 | 1/2008 | Mattsson et al. |
| 2008/0033907 A1 | 2/2008 | Woehler et al. |
| 2008/0046804 A1 | 2/2008 | Rui et al. |
| 2008/0072150 A1 | 3/2008 | Chan et al. |
| 2008/0120283 A1 | 5/2008 | Liu et al. |
| 2008/0155565 A1 | 6/2008 | Poduri |
| 2008/0168135 A1 | 7/2008 | Redlich et al. |
| 2008/0235238 A1 | 9/2008 | Jalobeanu et al. |
| 2008/0263179 A1 | 10/2008 | Buttner et al. |
| 2008/0276241 A1 | 11/2008 | Bajpai et al. |
| 2008/0319951 A1 | 12/2008 | Ueno et al. |
| 2009/0019029 A1 | 1/2009 | Tommaney et al. |
| 2009/0037391 A1 | 2/2009 | Agrawal et al. |
| 2009/0055370 A1 | 2/2009 | Dagum et al. |
| 2009/0089312 A1 | 4/2009 | Chi et al. |
| 2009/0248902 A1 | 10/2009 | Blue |
| 2009/0254516 A1 | 10/2009 | Meiyyappan et al. |
| 2009/0300770 A1 | 12/2009 | Rowney et al. |
| 2009/0319058 A1 | 12/2009 | Rovaglio et al. |
| 2009/0319484 A1 | 12/2009 | Golbandi et al. |
| 2009/0327242 A1 | 12/2009 | Brown et al. |
| 2010/0036801 A1 | 2/2010 | Pirvali et al. |
| 2010/0047760 A1 | 2/2010 | Best et al. |
| 2010/0049715 A1 | 2/2010 | Jacobsen et al. |
| 2010/0161555 A1 | 6/2010 | Nica et al. |
| 2010/0186082 A1 | 7/2010 | Ladki et al. |
| 2010/0199161 A1 | 8/2010 | Aureglia et al. |
| 2010/0205017 A1 | 8/2010 | Sichelman et al. |
| 2010/0205351 A1 | 8/2010 | Wiener et al. |
| 2010/0281005 A1 | 11/2010 | Carlin et al. |
| 2010/0281071 A1 | 11/2010 | Ben-Zvi et al. |
| 2011/0126110 A1 | 5/2011 | Vilke et al. |
| 2011/0126154 A1 | 5/2011 | Boehler et al. |
| 2011/0153603 A1 | 6/2011 | Adiba et al. |
| 2011/0161378 A1 | 6/2011 | Williamson |
| 2011/0167020 A1 | 7/2011 | Yang et al. |
| 2011/0194563 A1 | 8/2011 | Shen et al. |
| 2011/0314019 A1 | 12/2011 | Jimenez Peris et al. |
| 2012/0110030 A1 | 5/2012 | Pomponio |
| 2012/0144234 A1 | 6/2012 | Clark et al. |
| 2012/0159303 A1 | 6/2012 | Friedrich et al. |
| 2012/0191446 A1 | 7/2012 | Binsztok et al. |
| 2012/0192096 A1 | 7/2012 | Bowman et al. |
| 2012/0197868 A1 | 8/2012 | Fauser et al. |
| 2012/0209886 A1 | 8/2012 | Henderson |
| 2012/0215741 A1 | 8/2012 | Poole et al. |
| 2012/0221528 A1 | 8/2012 | Renkes |
| 2012/0246052 A1 | 9/2012 | Taylor et al. |
| 2012/0254143 A1 | 10/2012 | Varma et al. |
| 2012/0259759 A1 | 10/2012 | Crist et al. |
| 2012/0296846 A1 | 11/2012 | Teeter |
| 2013/0041946 A1 | 2/2013 | Joel et al. |
| 2013/0080514 A1 | 3/2013 | Gupta et al. |
| 2013/0086107 A1 | 4/2013 | Genochio et al. |
| 2013/0166556 A1 | 6/2013 | Baeumges et al. |
| 2013/0179460 A1 | 7/2013 | Cervantes et al. |
| 2013/0185619 A1 | 7/2013 | Ludwig |
| 2013/0191370 A1 | 7/2013 | Chen et al. |
| 2013/0198232 A1 | 8/2013 | Shamgunov et al. |
| 2013/0226959 A1 | 8/2013 | Dittrich et al. |
| 2013/0246560 A1 | 9/2013 | Feng et al. |
| 2013/0263123 A1 | 10/2013 | Zhou et al. |
| 2013/0290243 A1 | 10/2013 | Hazel et al. |
| 2013/0304725 A1 | 11/2013 | Nee et al. |
| 2013/0304744 A1 | 11/2013 | McSherry et al. |
| 2013/0311352 A1 | 11/2013 | Kayanuma et al. |
| 2013/0311488 A1 | 11/2013 | Erdogan et al. |
| 2013/0318129 A1 | 11/2013 | Vingralek et al. |
| 2013/0346365 A1 | 12/2013 | Kan et al. |
| 2014/0019494 A1 | 1/2014 | Tang |
| 2014/0040203 A1 | 2/2014 | Lu et al. |
| 2014/0059646 A1 | 2/2014 | Hannel et al. |
| 2014/0082724 A1 | 3/2014 | Pearson et al. |
| 2014/0136521 A1 | 5/2014 | Pappas |
| 2014/0143123 A1 | 5/2014 | Banke et al. |
| 2014/0149997 A1 | 5/2014 | Kukreja et al. |
| 2014/0156618 A1 | 6/2014 | Castellano |
| 2014/0173023 A1 | 6/2014 | Varney et al. |
| 2014/0181036 A1 | 6/2014 | Dhamankar et al. |
| 2014/0181081 A1 | 6/2014 | Veldhuizen |
| 2014/0188924 A1 | 7/2014 | Ma et al. |
| 2014/0195558 A1 | 7/2014 | Murthy et al. |
| 2014/0201194 A1 | 7/2014 | Reddy et al. |
| 2014/0215446 A1 | 7/2014 | Araya et al. |
| 2014/0222768 A1 | 8/2014 | Rambo et al. |
| 2014/0229506 A1 | 8/2014 | Lee |
| 2014/0229874 A1 | 8/2014 | Strauss |
| 2014/0244687 A1 | 8/2014 | Shmueli et al. |
| 2014/0279810 A1 | 9/2014 | Mann et al. |
| 2014/0280522 A1 | 9/2014 | Watte |
| 2014/0282227 A1 | 9/2014 | Nixon et al. |
| 2014/0282444 A1 | 9/2014 | Araya et al. |
| 2014/0282540 A1 | 9/2014 | Bonnet et al. |
| 2014/0297611 A1 | 10/2014 | Abbour et al. |
| 2014/0317084 A1 | 10/2014 | Chaudhry et al. |
| 2014/0324821 A1 | 10/2014 | Meiyyappan et al. |
| 2014/0330700 A1 | 11/2014 | Studnitzer et al. |
| 2014/0330807 A1 | 11/2014 | Weyerhaeuser et al. |
| 2014/0344186 A1 | 11/2014 | Nadler |
| 2014/0344391 A1 | 11/2014 | Varney et al. |
| 2014/0372482 A1 | 12/2014 | Martin et al. |
| 2014/0380051 A1 | 12/2014 | Branish, II et al. |
| 2015/0019516 A1 | 1/2015 | Wein et al. |
| 2015/0026155 A1 | 1/2015 | Martin |
| 2015/0067640 A1 | 3/2015 | Booker et al. |
| 2015/0074066 A1 | 3/2015 | Li et al. |
| 2015/0082218 A1 | 3/2015 | Affoneh et al. |
| 2015/0088894 A1 | 3/2015 | Czarlinska et al. |
| 2015/0095381 A1 | 4/2015 | Chen et al. |
| 2015/0127599 A1 | 5/2015 | Schiebeler |
| 2015/0172117 A1 | 6/2015 | Dolinsky et al. |
| 2015/0188778 A1 | 7/2015 | Asayag et al. |
| 2015/0205588 A1 | 7/2015 | Bates et al. |

(56) References Cited

U.S. PATENT DOCUMENTS

| | | | |
|---|---|---|---|
| 2015/0254298 | A1 | 9/2015 | Bourbonnais et al. |
| 2015/0304182 | A1 | 10/2015 | Brodsky et al. |
| 2016/0026442 | A1 | 1/2016 | Chhaparia |
| 2016/0065670 | A1 | 3/2016 | Kimmel et al. |
| 2016/0125018 | A1 | 5/2016 | Tomoda et al. |
| 2016/0253294 | A1 | 9/2016 | Allen et al. |

FOREIGN PATENT DOCUMENTS

| | | | |
|---|---|---|---|
| EP | 1198769 | B1 | 6/2008 |
| EP | 2199961 | A1 | 6/2010 |
| EP | 2423816 | A1 | 2/2012 |
| EP | 2743839 | A1 | 6/2014 |
| RU | 2421798 | | 6/2011 |
| WO | 0000879 | A2 | 1/2000 |
| WO | 0179964 | A2 | 10/2001 |
| WO | 2011120161 | A1 | 10/2011 |
| WO | 2012136627 | A1 | 10/2012 |
| WO | WO-2014026220 | A1 | 2/2014 |
| WO | 2014143208 | A1 | 9/2014 |

OTHER PUBLICATIONS

"IBM—What is HBase?", dated Sep. 6, 2015. Retrieved from https://web.archive.org/web/20150906022050/http://www-01.ibm.com/software/data/infosphere/hadoop/hbase/.

"SAP HANA Administration Guide", dated Mar. 29, 2016, pp. 290-294. Retrieved from https://web.archive.org/web/20160417053656/http://help.sap.com/hana/SAP_HANA_Administration_Guide_en.pdf.

"Oracle Big Data Appliance—Perfect Balance Java API", dated Sep. 20, 2015. Retrieved from https://web.archive.org/web/20131220040005/http://docs.oracle.com/cd/E41604_01/doc.22/e41667/toc.htm.

"Oracle Big Data Appliance—X5-2", dated Sep. 6, 2015. Retrieved from https://web.archive.org/web/20150906185409/http://www.oracle.com/technetwork/database/bigdata-appliance/overview/bigdataappliance-datasheet-1883358.pdf.

"Sophia Database—Architecture", dated Jan. 18, 2016. Retrieved from https://web.archive.org/web/20160118052919/http://sphia.org/architecture.html.

"Google Protocol RPC Library Overview", dated Apr. 27, 2016. Retrieved from https://cloud.google.com/appengine/docs/python/tools/protorpc/ (last accessed Jun. 16, 2016).

"Maximize Data Value with Very Large Database Management by SAP® Sybase® IQ", dated 2013. Retrieved from http://www.sap.com/bin/sapcom/en_us/downloadasset.2013-06-jun-11-11.maximize-data-value-with-very-large-database-management-by-sap-sybase-iq-pdf.html.

"Microsoft Azure—Managing Access Control Lists (ACLs) for Endpoints by using PowerShell", dated Nov. 12, 2014. Retrieved from https://web.archive.org/web/20150110170715/http://msdn.microsoft.com/en-us/library/azure/dn376543.aspx.

"IBM InfoSphere BigInsights 3.0.0—Importing data from and exporting data to DB2 by using Sqoop", dated Jan. 15, 2015. Retrieved from https://web.archive.org/web/20150115034058/http://www-01.ibm.com/support/knowledgecenter/SSPT3X_3.0.0/com.ibm.swg.im.infosphere.biginsights.import.doc/doc/data_warehouse_sqoop.html.

"GNU Emacs Manual", dated Apr. 15, 2016, pp. 43-47. Retrieved from https://web.archive.org/web/20160415175915/http://www.gnu.org/software/emacs/manual/html_mono/emacs.html.

"Oracle® Big Data Appliance—Software User's Guide", dated Feb. 2015. Retrieved from https://docs.oracle.com/cd/E55905_01/doc.40/e55814.pdf.

"About Entering Commands in the Command Window", dated Dec. 16, 2015. Retrieved from https://knowledge.autodesk.com/support/autocad/learn-explore/caas/Cloud Help/cloudhelp/2016/ENU/AutoCAD-Core/files/GUID-BB0C3E79-66AF-4557-9140-D31B4CF3C9CF-htm.html (last accessed Jun. 16, 2016).

"Use Formula AutoComplete", dated 2010. Retrieved from https://support.office.com/en-us/article/Use-Formula-AutoComplete-c7c46fa6-3a94-4150-a2f7-34140c1ee4d9 (last accessed Jun. 16, 2016).

Mariyappan, Balakrishnan. "10 Useful Linux Bash_Completion Complete Command Examples (Bash Command Line Completion on Steroids)", dated Dec. 2, 2013. Retrieved from http://www.thegeekstuff.com/2013/12/bash-completion-complete/ (last accessed Jun. 16, 2016).

Cheusheva, Svetlana. "How to change the row color based on a cell's value in Excel", dated Oct. 29, 2013. Retrieved from https://www.ablebits.com/office-addins-blog/2013/10/29/excel-change-row-background-color/ (last accessed Jun. 16, 2016).

Jellema, Lucas. "Implementing Cell Highlighting in JSF-based Rich Enterprise Apps (Part 1)", dated Nov. 2008. Retrieved from http://www.oracle.com/technetwork/articles/adf/jellema-adfcellhighlighting-087850.html (last accessed Jun. 16, 2016).

Adelfio et al. "Schema Extraction for Tabular Data on the Web", Proceedings of the VLDB Endowment, vol. 6, No. 6. Apr. 2013. Retrieved from http://www.cs.umd.edu/~hjs/pubs/spreadsheets-vldb13.pdf.

"Change Data Capture", Oracle Database Online Documentation 11g Release 1 (11.1), dated Apr. 5, 2016. Retreived from https://web.archive.org/web/20160405032625/http://docs.oracle.com/cd/B28359_01/server.111/b28313/cdc.htm.

"Chapter 24. Query access plans", Tuning Database Performance, DB2 Version 9.5 for Linux, UNIX, and Windows, pp. 301-462, dated Dec. 2010. Retreived from http://public.dhe.ibm.com/ps/products/db2/info/vr95/pdf/en_US/DB2PerfTuneTroubleshootdb2d3e953.pdf.

"Tracking Data Changes", SQL Server 2008 R2, dated Sep. 22, 2015. Retreived from https://web.archive.org/web/20150922000614/https://technet.microsoft.com/en-us/library/bb933994(v=sql.105).aspx.

Borror, Jefferey A. "Q for Mortals 2.0", dated Nov. 1, 2011 Retreived from http://code.kx.com/wiki/JB:QforMortals2/contents.

Gai, Lei et al. "An Efficient Summary Graph Driven Method for RDF Query Processing", dated Oct. 27, 2015. Retreived from http://arxiv.org/pdf/1510.07749.pdf.

Lou, Yuan. "A Multi-Agent Decision Support System for Stock Trading", IEEE Network, Jan./Feb. 2002. Retreived from http://www.reading.ac.uk/AcaDepts/si/sisweb13/ais/papers/journal12-A%20multi-agent%20Framework.pdf.

Palpanas, Themistoklis et al. "Incremental Maintenance for Non-Distributive Aggregate Functions", Proceedings of the 28th VLDB Conference, 2002. Retreived from http://www.vldb.org/conf/2002/S22P04.pdf.

Wu, Buwen et al. "Scalable SPARQL Querying using Path Partitioning", 31st IEEE International Conference on Data Engineering (ICDE 2015), Seoul, Korea, Apr. 13-17, 2015. Retreived from http://imada.sdu.dk/~zhou/papers/icde2015.xlf.pdf.

Ex Parte Quayle Action mailed Aug. 8, 2016, in U.S. Appl. No. 15/154,999.

Final Office Action mailed Dec. 19, 2016, in U.S. Appl. No. 15/154,995.

International Search Report and Written Opinion dated Aug. 18, 2016, in International Appln. No. PCT/US2016/032582 filed May 14, 2016.

International Search Report and Written Opinion dated Aug. 18, 2016, in International Appln. No. PCT/US2016/032584 filed May 14, 2016.

International Search Report and Written Opinion dated Aug. 18, 2016, in International Appln. No. PCT/US2016/032588 filed May 14, 2016.

International Search Report and Written Opinion dated Aug. 18, 2016, in International Appln. No. PCT/US2016/032593 filed May 14, 2016.

International Search Report and Written Opinion dated Aug. 18, 2016, in International Appln. No. PCT/US2016/032597 filed May 14, 2016.

(56) References Cited

OTHER PUBLICATIONS

International Search Report and Written Opinion dated Aug. 18, 2016, in International Appln. No. PCT/US2016/032599 filed May 14, 2016.
International Search Report and Written Opinion dated Aug. 18, 2016, in International Appln. No. PCT/US2016/032605 filed May 14, 2016.
International Search Report and Written Opinion dated Aug. 25, 2016, in International Appln. No. PCT/US2016/032590 filed May 14, 2016.
International Search Report and Written Opinion dated Aug. 25, 2016, in International Appln. No. PCT/US2016/032592 filed May 14, 2016.
International Search Report and Written Opinion dated Aug. 4, 2016, in International Appln. No. PCT/US2016/032581 filed May 14, 2016.
International Search Report and Written Opinion dated Jul. 28, 2016, in International Appln. No. PCT/US2016/032586 filed May 14, 2016.
International Search Report and Written Opinion dated Jul. 28, 2016, in International Appln. No. PCT/US2016/032587 filed May 14, 2016.
International Search Report and Written Opinion dated Jul. 28, 2016, in International Appln. No. PCT/US2016/032589 filed May 14, 2016.
International Search Report and Written Opinion dated Sep. 1, 2016, in International Appln. No. PCT/US2016/032596 filed May 14, 2016.
International Search Report and Written Opinion dated Sep. 1, 2016, in International Appln. No. PCT/US2016/032598 filed May 14, 2016.
International Search Report and Written Opinion dated Sep. 1, 2016, in International Appln. No. PCT/US2016/032601 filed May 14, 2016.
International Search Report and Written Opinion dated Sep. 1, 2016, in International Appln. No. PCT/US2016/032602 filed May 14, 2016.
International Search Report and Written Opinion dated Sep. 1, 2016, in International Appln. No. PCT/US2016/032607 filed May 14, 2016.
International Search Report and Written Opinion dated Sep. 15, 2016, in International Appln. No. PCT/US2016/032591 filed May 14, 2016.
International Search Report and Written Opinion dated Sep. 15, 2016, in International Appln. No. PCT/US2016/032594 filed May 14, 2016.
International Search Report and Written Opinion dated Sep. 15, 2016, in International Appln. No. PCT/US2016/032600 filed May 14, 2016.
International Search Report and Written Opinion dated Sep. 29, 2016, in International Appln. No. PCT/US2016/032595 filed May 14, 2016.
International Search Report and Written Opinion dated Sep. 29, 2016, in International Appln. No. PCT/US2016/032606 filed May 14, 2016.
International Search Report and Written Opinion dated Sep. 8, 2016, in International Appln. No. PCT/US2016/032603 filed May 14, 2016.
International Search Report and Written Opinion dated Sep. 8, 2016, in International Appln. No. PCT/US2016/032604 filed May 14, 2016.
Mallet, "Relational Database Support for Spatio-Temporal Data", Technical Report TR 4-21, Sep. 2004, University of Alberta, Department of Computing Science.
Non-final Office Action mailed Aug. 12, 2016, in U.S. Appl. No. 15/155,001.
Non-final Office Action mailed Aug. 16, 2016, in U.S. Appl. No. 15/154,993.
Non-final Office Action mailed Aug. 19, 2016, in U.S. Appl. No. 15/154,991.
Non-final Office Action mailed Aug. 25, 2016, in U.S. Appl. No. 15/154,980.
Non-final Office Action mailed Aug. 26, 2016, in U.S. Appl. No. 15/154,995.
Non-final Office Action mailed Aug. 8, 2016, in U.S. Appl. No. 15/154,983.
Non-final Office Action mailed Aug. 8, 2016, in U.S. Appl. No. 15/154,985.
Non-final Office Action mailed Nov. 17, 2016, in U.S. Appl. No. 15/154,999.
Non-final Office Action mailed Oct. 13, 2016, in U.S. Appl. No. 15/155,009.
Non-final Office Action mailed Oct. 27, 2016, in U.S. Appl. No. 15/155,006.
Non-final Office Action mailed Oct. 7, 2016, in U.S. Appl. No. 15/154,998.
Non-final Office Action mailed Sep. 1, 2016, in U.S. Appl. No. 15/154,979.
Non-final Office Action mailed Sep. 1, 2016, in U.S. Appl. No. 15/155,011.
Non-final Office Action mailed Sep. 1, 2016, in U.S. Appl. No. 15/155,012.
Non-final Office Action mailed Sep. 14, 2016, in U.S. Appl. No. 15/154,984.
Non-final Office Action mailed Sep. 16, 2016, in U.S. Appl. No. 15/154,988.
Non-final Office Action mailed Sep. 26, 2016, in U.S. Appl. No. 15/155,005.
Non-final Office Action mailed Sep. 29, 2016, in U.S. Appl. No. 15/154,990.
Non-final Office Action mailed Sep. 8, 2016, in U.S. Appl. No. 15/154,975.
Non-final Office Action mailed Sep. 9, 2016, in U.S. Appl. No. 15/154,996.
Non-final Office Action mailed Sep. 9, 2016, in U.S. Appl. No. 15/155,010.
Notice of Allowance mailed Dec. 19, 2016, in U.S. Appl. No. 15/155,001.
Notice of Allowance mailed Dec. 22, 2016, in U.S. Appl. No. 15/155,011.
Notice of Allowance mailed Dec. 7, 2016, in U.S. Appl. No. 15/154,985.
Notice of Allowance mailed Nov. 17, 2016, in U.S. Appl. No. 15/154,991.
Notice of Allowance mailed Nov. 21, 2016, in U.S. Appl. No. 15/154,983.
Notice of Allowance mailed Nov. 8, 2016, in U.S. Appl. No. 15/155,007.
Notice of Allowance mailed Oct. 11, 2016, in U.S. Appl. No. 15/155,007.
Notice of Allowance mailed Oct. 21, 2016, in U.S. Appl. No. 15/154,999.
PowerShell Team, Intellisense in Windows PowerShell ISE 3.0, dated Jun. 12, 2012, Windows PowerShell Blog, pp. 1-6 Retrieved: https://biogs.msdn.microsoft.com/powershell/2012/06/12/intellisense-in-windows-powershell-ise-3-0/.
Smith, Ian. "Guide to Using SQL: Computed and Automatic Columns." Rbd Jornal, dated Sep. 2008, retrieved Aug. 15, 2016, retrieved from the Internet <URL: http://www.oracle.com/technetwork/products/rdb/automatic-columns-132042.pdf>.

* cited by examiner

400 Interest Table

| STOCK SYMBOL 402 |
| --- |
| AAPL |
| SPY |

FIG. 4

500 Quotes Received Table

| STOCK SYMBOL 502 | QUOTE DATA 504 | QUOTE TIME 506 | QUOTE 508 |
| --- | --- | --- | --- |
| AAPL | 2/17/16 | 9:31 | $95.67 |
| CMI | 2/17/16 | 9:31 | $97.85 |
| SPY | 2/17/16 | 9:31 | $91.02 |
| AAPL | 2/17/16 | 9:32 | $96.20 |
| CMI | 2/17/16 | 9:32 | $96.93 |
| SPY | 2/17/16 | 9:32 | $91.20 |

FIG. 5

600 Filtered Quotes Table

| STOCK SYMBOL 602 | QUOTE DATA 604 | QUOTE TIME 606 | QUOTE 608 |
| --- | --- | --- | --- |
| AAPL | 2/17/16 | 9:31 | $95.67 |
| SPY | 2/17/16 | 9:31 | $91.02 |
| AAPL | 2/17/16 | 9:32 | $96.20 |
| SPY | 2/17/16 | 9:32 | $91.20 |

FIG. 6

DYNAMIC FILTER PROCESSING

This application claims the benefit of U.S. Provisional Application No. 62/161,813, entitled "Computer Data System" and filed on May 14, 2015, which is incorporated herein by reference in its entirety.

Embodiments relate generally to computer data systems, and more particularly, to methods, systems and computer readable media for providing a dynamic data filter.

Filtering clauses can be used to narrow a larger data source into a focused subset of the larger data source based on one or more filtering criteria. For example, traditional Structured Query Language provides a "where" clause for filtering. In a system that has rapidly changing data sources, filtering is additionally complicated by the rapidly changing nature of the data sources. Filtering clauses can contain one or more filtering criteria that can be a single expression or a list of expressions kept in a separate table, file, or other data structure. This method for filtering with a list of expressions creates a static two step process of first retrieving the one or more filtering criteria from a list and then second, filtering a target data table by retrieving all the rows of data from the table where the criteria in the list are a match. An incomplete or incorrect result set can be obtained when a change occurs in the filtering criteria list after step one has been performed but before step two can be completed because the operation performed in step two is unaware of the changes in the filtering criteria list. A table join operation can also be used to join a filtering criteria table with a data table frequently to ensure that a change in the filtering criteria table will be added to the result. Such frequent joins of large tables can be resource expensive.

Embodiments were conceived in light of the above mentioned needs, problems and/or limitations, among other things.

Some implementations can include a system for automatically updating data source objects, the system comprising one or more hardware processors and a computer readable data storage device coupled to the one or more hardware processors, the computer readable data storage device having stored thereon software instructions that, when executed by the one or more hardware processors, cause the one or more hardware processors to perform operations. The operations can include creating a first data source object in memory and mapping the first data source object to a first stored data. The operation can also include creating a second data source object in memory and mapping the second data source object to a second stored data. The operations can further include creating a third data source object in memory and mapping the third data source object to a first subset of the first stored data by filtering the first stored data mapped to the first data source object with the second stored data mapped to the second data source object. The operations can include creating a first listener for the third data source object in memory and listening with the first listener for one or more changes to the first data source object. The operations can also include making one or more changes to the first data source object. The operations can further include detecting by the first listener of one or more changes to the first data source object. The operation can include receiving a notification from the first listener of the change to the first data source object and then updating the mapping of the third data source object with the one or more changes to the first data source object.

The operations can further include creating a second listener for the second data source object in memory and listening with the second listener for one or more changes to the second data source object. The operations can include making one or more changes to the second data source object. The operations can also include detecting by the second listener of one or more changes to the second data source object. The operations can include receiving a notification of one or more changes to the second data source object and requesting a remapping of the third data source object to a second subset of first stored data by filtering the first stored data mapped to the first data source object with the second stored data mapped to the second data source object. The operations can further include updating the mapping of the third data source object to a subset of first stored data by filtering the first stored data mapped to the first data source object with the second stored data mapped to the second data source object.

In some implementations, the mapping the third data source object to a first subset of the first stored data by filtering the first stored data mapped to the first data source object with the second stored data mapped to the second data source object can include selecting a set of rows from the first stored data with one or more key values that are present in the second stored data.

In some implementations, the mapping the third data source object to a first subset of the first stored data by filtering the first stored data mapped to the first data source object with the second stored data mapped to the second data source object can include selecting a set of rows form the first stored data with one or more key values that are not present in the second stored data.

In some implementations, the operations can further include creating a second listener for the second data source object in memory and listening with the second listener for one or more changes to the second data source object. The operations can include making one or more changes to the second data source object. The operations can also include detecting by the second listener of one or more changes to the second data source object. The operations can further include receiving a notification of one or more changes to the second data source object and determining whether to request a remapping of the third data source object to a second subset of first stored data by filtering the first stored data mapped to the first data source object with the second stored data mapped to the second data source object, the determination based on whether the one or more changes to the second data source object effected an overall change in the second data source. The operations can include updating the mapping of the third data source object to a subset of first stored data by filtering the first stored data mapped to the first data source object with the second stored data mapped to the second data source object only if the one or more changes to the second data source object effected an overall change in the second data source.

A change to the first data source object can include at least one of adding a row to the first data source object, deleting a row from the first data source object changing the data in a row of the first data source object, and re-indexing the rows of the first data source object.

A change to the second data source object can include at least one of adding a row to the second data source object, deleting a row from the second data source object, changing the data in a row of the second data source object, and re-indexing the rows of the second data source object.

Some implementations can include a method for using a computer system to automatically update data source objects, the method comprising creating a first data source object in memory and mapping the first data source object to a first stored data. The method can also include creating a second data source object in memory and mapping the second data source object to a second stored data. The method can further include creating a third data source object in memory and mapping the third data source object to a first subset of the first stored data by filtering the first stored data mapped to the first data source object with the second stored data mapped to the second data source object. The method can include creating a first listener for the third data source object in memory and listening with the first listener for one or more changes to the first data source object. The method can also include making one or more changes to the first data source object. The method can further include detecting by the first listener of one or more changes to the first data source object. The method can include receiving a notification from the first listener of the change to the first data source object and updating the mapping of the third data source object with the one or more changes to the first data source object.

The method can further include creating a second listener for the second data source object in memory and listening with the second listener for one or more changes to the second data source object. The method can include making one or more changes to the second data source object. The method can also include detecting by the second listener of one or more changes to the second data source object. The method can further include receiving a notification of one or more changes to the second data source object and requesting a remapping of the third data source object to a second subset of first stored data by filtering the first stored data mapped to the first data source object with the second stored data mapped to the second data source object. The method can also include updating the mapping of the third data source object to a subset of first stored data by filtering the first stored data mapped to the first data source object with the second stored data mapped to the second data source object.

In some implementations, the mapping the third data source object to a first subset of the first stored data by filtering the first stored data mapped to the first data source object with the second stored data mapped to the second data source object can include selecting a set of rows from the first stored data with one or more key values that are present in the second stored data.

In some implementations, the mapping the third data source object to a first subset of the first stored data by filtering the first stored data mapped to the first data source object with the second stored data mapped to the second data source object includes selecting a set of rows form the first stored data with one or more key values that are not present in the second stored data.

The method can further include creating a second listener for the second data source object in memory listening with the second listener for one or more changes to the second data source object. The method can include making one or more changes to the second data source object. The method can also include detecting by the second listener of one or more changes to the second data source object. The method can further include receiving a notification of one or more changes to the second data source object and determining whether to request a remapping of the third data source object to a second subset of first stored data by filtering the first stored data mapped to the first data source object with the second stored data mapped to the second data source object, the determination based on whether the one or more changes to the second data source object effected an overall change in the second data source. The method can include updating the mapping of the third data source object to a subset of first stored data by filtering the first stored data mapped to the first data source object with the second stored data mapped to the second data source object only if the one or more changes to the second data source object effected an overall change in the second data source.

A change to the first data source object can include at least one of adding a row to the first data source object, deleting a row from the first data source object, changing the data in a row of the first data source object, and re-indexing the rows of the first data source object.

A change to the second data source object can include at least one of adding a row to the second data source object, deleting a row from the second data source object, changing the data in a row of the second data source object, and re-indexing the rows of the second data source object.

Some implementations can include a nontransitory computer readable medium having stored thereon software instructions that, when executed by one or more processors, cause the one or more processors to perform operations. The operations can include creating a first data source object in memory and mapping the first data source object to a first stored data. The operations can also include creating a second data source object in memory and mapping the second data source object to a second stored data. The operations can further include creating a third data source object in memory and mapping the third data source object to a first subset of the first stored data by filtering the first stored data mapped to the first data source object with the second stored data mapped to the second data source object. The operations can include creating a first listener for the third data source object in memory and listening with the first listener for one or more changes to the first data source object. The operations can also include making one or more changes to the first data source object. The operations can further include detecting by the first listener of one or more changes to the first data source object. The operations can include receiving a notification from the first listener of the change to the first data source object and updating the mapping of the third data source object with the one or more changes to the first data source object.

The operations can further include creating a second listener for the second data source object in memory and listening with the second listener for one or more changes to the second data source object. The operations can include making one or more changes to the second data source object. The operations can further include detecting by the second listener of one or more changes to the second data source object. The operations can also include receiving a notification of one or more changes to the second data source object and requesting a remapping of the third data source object to a second subset of first stored data by filtering the first stored data mapped to the first data source object with the second stored data mapped to the second data source object. The operations can further include updating the mapping of the third data source object to a subset of first stored data by filtering the first stored data mapped to the first data source object with the second stored data mapped to the second data source object.

In some implementations, the mapping the third data source object to a first subset of the first stored data by filtering the first stored data mapped to the first data source object with the second stored data mapped to the second data source object can include selecting a set of rows from the first stored data with one or more key values that are present in the second stored data.

The operations can further include creating a second listener for the second data source object in memory and listening with the second listener for one or more changes to the second data source object. The operations can include making one or more changes to the second data source object. The operations can also include detecting by the second listener of one or more changes to the second data source object. The operations can further include receiving a notification of one or more changes to the second data source object and determining whether to request a remapping of the third data source object to a second subset of first stored data by filtering the first stored data mapped to the first data source object with the second stored data mapped to the second data source object, the determination based on whether the one or more changes to the second data source object effected an overall change in the second data source. The operations can include updating the mapping of the third data source object to a subset of first stored data by filtering the first stored data mapped to the first data source object with the second stored data mapped to the second data source object only if the one or more changes to the second data source object effected an overall change in the second data source.

A change to the first data source object can includes at least one of adding a row to the first data source object, deleting a row from the first data source object, changing the data in a row of the first data source object, and re-indexing the rows of the first data source object.

A change to the second data source object includes at least one of adding a row to the second data source object, deleting a row from the second data source object, changing the data in a row of the second data source object, and re-indexing the rows of the second data source object.

BRIEF DESCRIPTION OF THE DRAWINGS

FIG. 4 is a diagram of an example interest table in accordance with some implementations.

FIG. 5 is a diagram of an example data table in accordance with some implementations.

FIG. 6 is a diagram of an example interest filtered data table in accordance with some implementations.

DETAILED DESCRIPTION

Reference is made herein to the Java programming language, Java classes, Java bytecode and the Java Virtual Machine (JVM) for purposes of illustrating example implementations. It will be appreciated that implementations can include other programming languages (e.g., groovy, Scala, R, Go, etc.), other programming language structures as an alternative to or in addition to Java classes (e.g., other language classes, objects, data structures, program units, code portions, script portions, etc.), other types of bytecode, object code and/or executable code, and/or other virtual machines or hardware implemented machines configured to execute a data system query.

Figure 1:
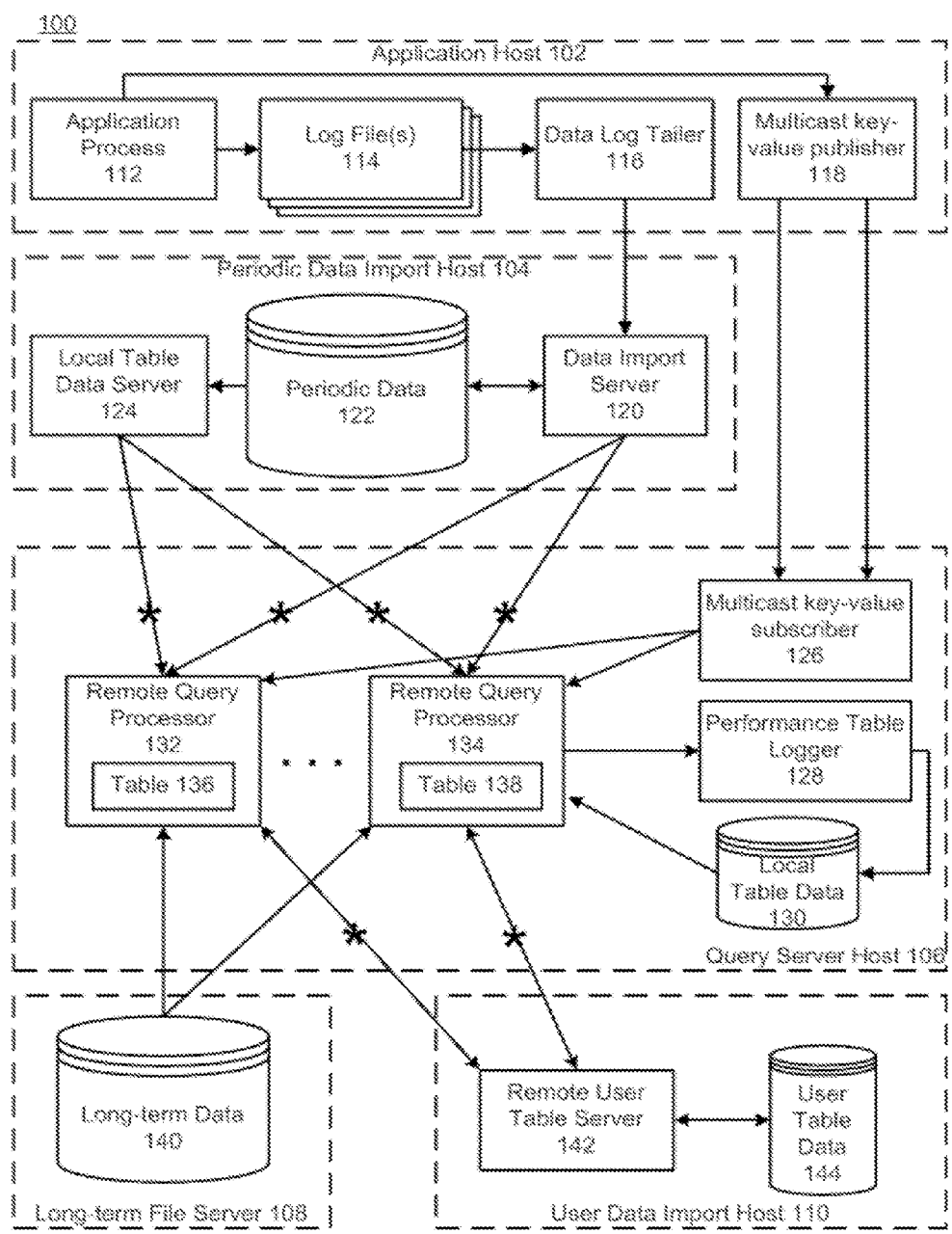
FIG. 1 is a diagram of an example computer data system showing an example data distribution configuration in accordance with some implementations.
Figure 2:
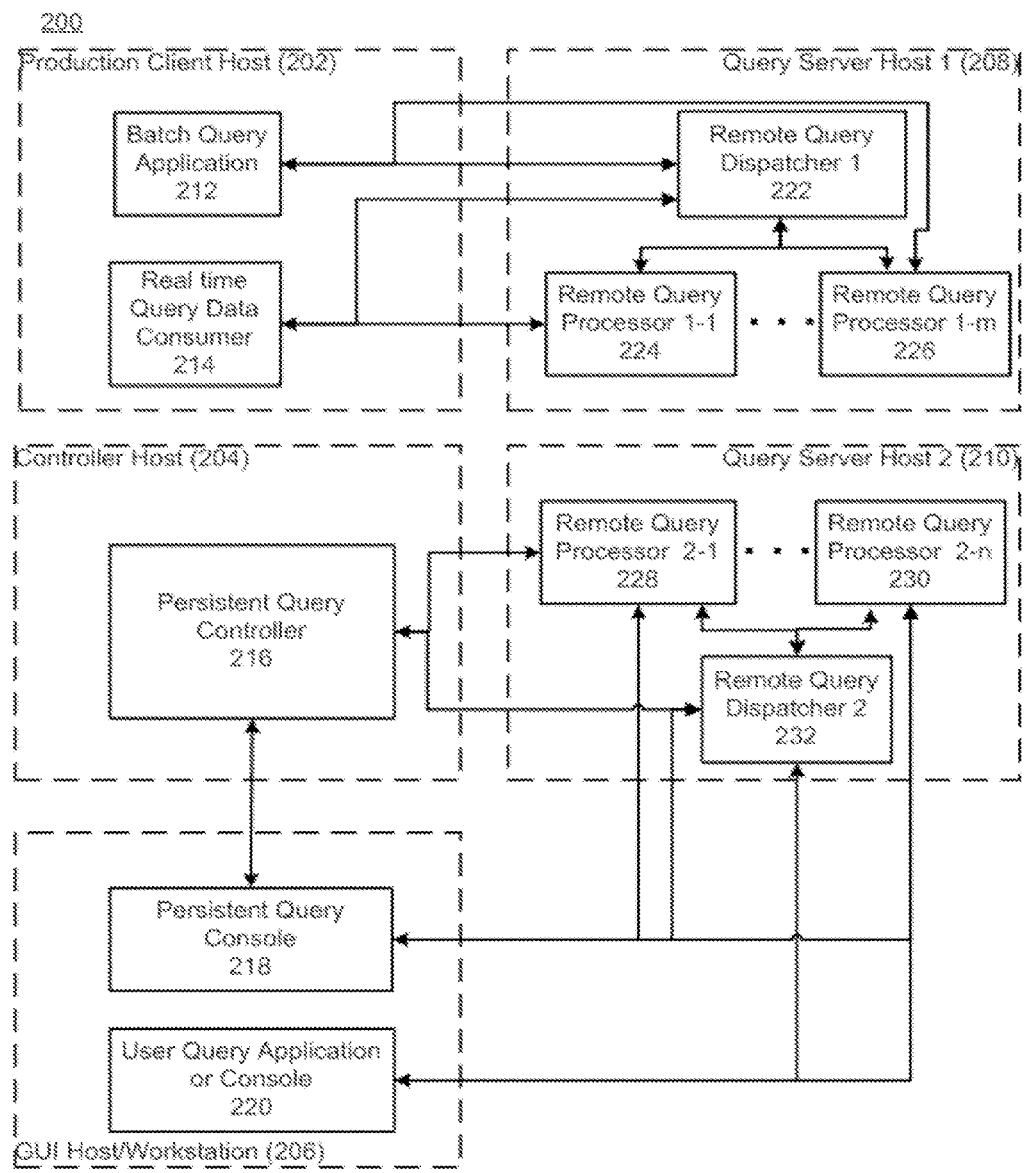
FIG. 2 is a diagram of an example computer data system showing an example administration/process control arrangement in accordance with some implementations.

FIG. 1 is a diagram of an example computer data system and network 100 showing an example data distribution configuration in accordance with some implementations. In particular, the system 100 includes an application host 102, a periodic data import host 104, a query server host 106, a long-term file server 108, and a user data import host 110. While tables are used as an example data object in the description below, it will be appreciated that the data system described herein can also process other data objects such as mathematical objects (e.g., a singular value decomposition of values in a given range of one or more rows and columns of a table), TableMap objects, etc. A TableMap object provides the ability to lookup a Table by some key. This key represents a unique value (or unique tuple of values) from the columns aggregated on in a byExternal( ) statement execution, for example. A TableMap object can be the result of a byExternal( ) statement executed as part of a query. It will also be appreciated that the configurations shown in FIGS. 1 and 2 are for illustration purposes and in a given implementation each data pool (or data store) may be directly attached or may be managed by a file server.

The application host 102 can include one or more application processes 112, one or more log files 114 (e.g., sequential, row-oriented log files), one or more data log tailers 116 and a multicast key-value publisher 118. The periodic data import host 104 can include a local table data server, direct or remote connection to a periodic table data store 122 (e.g., a column-oriented table data store) and a data import server 120. The query server host 106 can include a multicast key-value subscriber 126, a performance table logger 128, local table data store 130 and one or more remote query processors (132, 134) each accessing one or more respective tables (136, 138). The long-term file server 108 can include a long-term data store 140. The user data import host 110 can include a remote user table server 142 and a user table data store 144. Row-oriented log files and column-oriented table data stores are discussed herein for illustration purposes and are not intended to be limiting. It will be appreciated that log files and/or data stores may be configured in other ways. In general, any data stores discussed herein could be configured in a manner suitable for a contemplated implementation.

In operation, the input data application process 112 can be configured to receive input data from a source (e.g., a securities trading data source), apply schema-specified, generated code to format the logged data as it's being prepared for output to the log file 114 and store the received data in the sequential, row-oriented log file 114 via an optional data logging process. In some implementations, the data logging process can include a daemon, or background process task, that is configured to log raw input data received from the application process 112 to the sequential, row-oriented log files on disk and/or a shared memory queue (e.g., for sending data to the multicast publisher 118). Logging raw input data to log files can additionally serve to provide a backup copy of data that can be used in the event that downstream processing of the input data is halted or interrupted or otherwise becomes unreliable.

A data log tailer 116 can be configured to access the sequential, row-oriented log file(s) 114 to retrieve input data logged by the data logging process. In some implementations, the data log tailer 116 can be configured to perform strict byte reading and transmission (e.g., to the data import server 120). The data import server 120 can be configured to store the input data into one or more corresponding data stores such as the periodic table data store 122 in a column-oriented configuration. The periodic table data store 122 can be used to store data that is being received within a time period (e.g., a minute, an hour, a day, etc.) and which may be later processed and stored in a data store of the long-term file server 108. For example, the periodic table data store 122 can include a plurality of data servers configured to store periodic securities trading data according to one or more characteristics of the data (e.g., a data value such as security symbol, the data source such as a given trading exchange, etc.).

The data import server 120 can be configured to receive and store data into the periodic table data store 122 in such a way as to provide a consistent data presentation to other parts of the system. Providing/ensuring consistent data in this context can include, for example, recording logged data to a disk or memory, ensuring rows presented externally are available for consistent reading (e.g., to help ensure that if the system has part of a record, the system has all of the record without any errors), and preserving the order of records from a given data source. If data is presented to clients, such as a remote query processor (132, 134), then the data may be persisted in some fashion (e.g., written to disk).

The local table data server 124 can be configured to retrieve data stored in the periodic table data store 122 and provide the retrieved data to one or more remote query processors (132, 134) via an optional proxy.

The remote user table server (RUTS) 142 can include a centralized consistent data writer, as well as a data server that provides processors with consistent access to the data that it is responsible for managing. For example, users can provide input to the system by writing table data that is then consumed by query processors.

The remote query processors (132, 134) can use data from the data import server 120, local table data server 124 and/or from the long-term file server 108 to perform queries. The remote query processors (132, 134) can also receive data from the multicast key-value subscriber 126, which receives data from the multicast key-value publisher 118 in the application host 102. The performance table logger 128 can log performance information about each remote query processor and its respective queries into a local table data store 130. Further, the remote query processors can also read data from the RUTS, from local table data written by the performance logger, or from user table data read over NFS.

It will be appreciated that the configuration shown in FIG. 1 is a typical example configuration that may be somewhat idealized for illustration purposes. An actual configuration may include one or more of each server and/or host type. The hosts/servers shown in FIG. 1 (e.g., 102-110, 120, 124 and 142) may each be separate or two or more servers may be combined into one or more combined server systems. Data stores can include local/remote, shared/isolated and/or redundant. Any table data may flow through optional proxies indicated by an asterisk on certain connections to the remote query processors. Also, it will be appreciated that the term "periodic" is being used for illustration purposes and can include, but is not limited to, data that has been received within a given time period (e.g., millisecond, second, minute, hour, day, week, month, year, etc.) and which has not yet been stored to a long-term data store (e.g., 140).

FIG. 2 is a diagram of an example computer data system 200 showing an example administration/process control arrangement in accordance with some implementations. The system 200 includes a production client host 202, a controller host 204, a GUI host or workstation 206, and query server hosts 208 and 210. It will be appreciated that there may be one or more of each of 202-210 in a given implementation.

The production client host 202 can include a batch query application 212 (e.g., a query that is executed from a command line interface or the like) and a real time query data consumer process 214 (e.g., an application that connects to and listens to tables created from the execution of a separate query). The batch query application 212 and the real time query data consumer 214 can connect to a remote query dispatcher 222 and one or more remote query processors (224, 226) within the query server host 1 208.

The controller host 204 can include a persistent query controller 216 configured to connect to a remote query dispatcher 232 and one or more remote query processors 228-230. In some implementations, the persistent query controller 216 can serve as the "primary client" for persistent queries and can request remote query processors from dispatchers, and send instructions to start persistent queries. For example, a user can submit a query to 216, and 216 starts and runs the query every day. In another example, a securities trading strategy could be a persistent query. The persistent query controller can start the trading strategy query every morning before the market open, for instance. It will be appreciated that 216 can work on times other than days. In some implementations, the controller may require its own clients to request that queries be started, stopped, etc. This can be done manually, or by scheduled (e.g., cron)jobs. Some implementations can include "advanced scheduling" (e.g., auto-start/stop/restart, time-based repeat, etc.) within the controller.

The GUI/host workstation can include a user console 218 and a user query application 220. The user console 218 can be configured to connect to the persistent query controller 216. The user query application 220 can be configured to connect to one or more remote query dispatchers (e.g., 232) and one or more remote query processors (228, 230).

Figure 3:
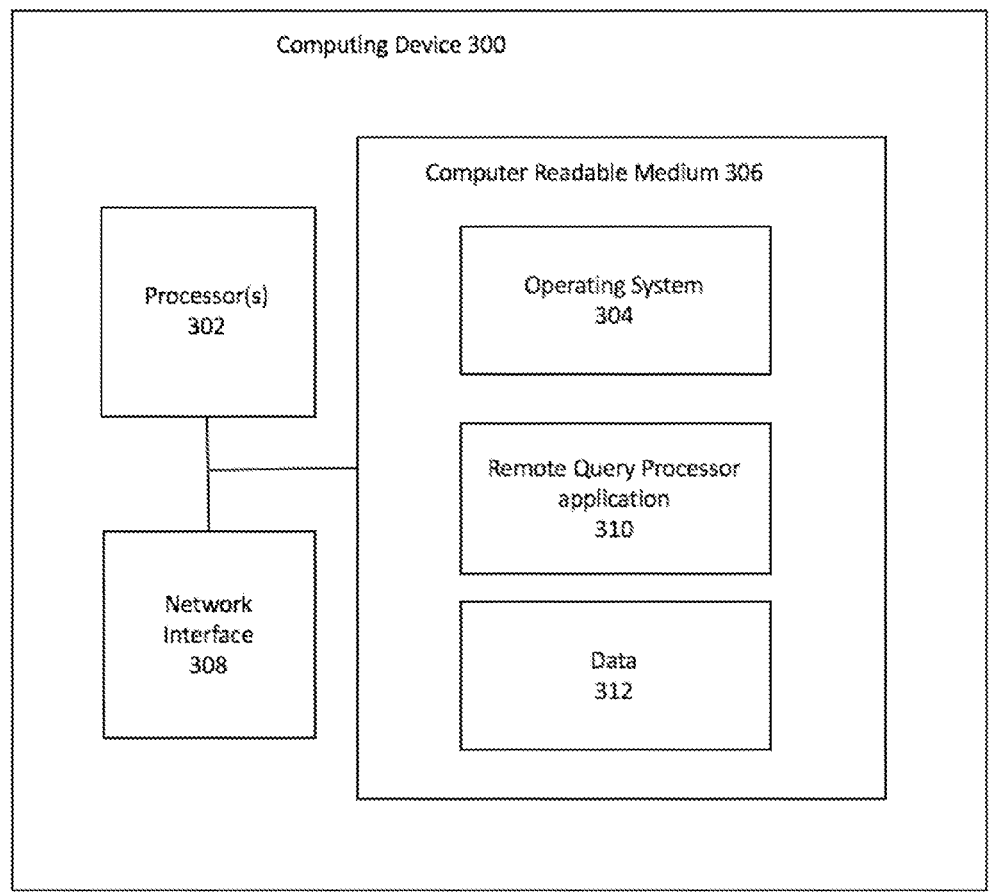
FIG. 3 is a diagram of an example computing device configured for dynamic filter operations processing in accordance with some implementations.

FIG. 3 is a diagram of an example computing device 300 in accordance with at least one implementation. The computing device 300 includes one or more processors 302, operating system 304, computer readable medium 306 and network interface 308. The memory 306 can include remote query processor application 310 and a data section 312 (e.g., for storing ASTs, precompiled code, etc.).

In operation, the processor 302 may execute the application 310 stored in the memory 306. The application 310 can include software instructions that, when executed by the processor, cause the processor to perform operations for executing and updating queries and dynamic filter operations in accordance with the present disclosure (e.g., performing one or more of 702-712, 802-822 described below).

The application program 310 can operate in conjunction with the data section 312 and the operating system 304.

Large data systems can be dynamic in nature with continuing steams of data being added by the second or even the microsecond. Users of a large data system may only be interested in a subset of the large data. For example, thousands of stock symbols exist but a user may only desire to follow a few favorites. To that end, a user may keep those favorites in a list that can be routinely updated over time. The user can use the favorites list to filter the large data source to retrieve only the data of interest. The filtering can occur every microsecond, second, minute, hour, day, or longer depending on how quickly the data is being added, deleted, or modified in the large data source. After the initial filtering, only supplemental filtering of the added, deleted, modified, re-indexed data can be required to keep the user up to date as long as the user does not change the favorites list. If the favorites list changes through a deletion or addition in the list, the complete large data source can be filtered to bring the user's result set up to date. To relieve the system from constantly re-filtering the large data set to keep the user up to date, the system can create listeners to monitor for changes to the favorites list and the large data source. If the listener detects an effective change in the favorites list, the system then knows to re-filter the full large data source, but if the listener only detects changes to the large data source, the system knows to only do supplemental updates to the user's result set.

FIG. 4 is a diagram of an example of an interest data source that can be an interest table (user's favorites list) 400 in accordance with some implementations. The interest table 400 can contain one or more rows of data. The one or more rows of data in an interest table 400 can be used to provide filter parameters for filtering another data source. For example, the interest table 400 can contain interest data such as a stock symbol column 402 that can contain stock symbols (AAPL, SPY) that are of interest for filtering a larger data source that can contain additional information about the stock symbols AAPL and SPY.

It will be appreciated that an interest data source can be stored in forms and formats other than a table, such as a table object, a flat file, an array, or the like. It will also be appreciated that interest data is not limited to a single column or field. For example, the interest data could occupy one or more columns or fields that contain key values for filtering such as Symbol or Symbol and Price.

FIG. 5 is a diagram of an example data source that can be a quotes received table 500 in accordance with some implementations. The data source can contain any selection of data. For example, a data source can contain stock symbols 502, the associated quote date 504, associated quote time 506, and the associated quote 508 that occurred on the quote date 504 and at the quote time 506.

It will be appreciated that the data source can be stored in forms and formats other than a table, such as a table object, a flat file, an array, or the like. It will also be appreciated that the data source is not limited to a particular number of columns or fields. For example, the data source could expand to as many columns or fields that can be supported by the data source system.

FIG. 6 is a diagram of an example filtered data source that can be a filtered quote table 600 in accordance with some implementations. The filtered quote table can be the result of the quotes received table 500 filtered by stock symbol 402 of the interest table 400. For example, quotes received table 500 with stock symbol 502 can contain quotes received over time for stock symbols AAPL, CMI, and SPY. The interest table can contain stock symbol 402 that can contain AAPL and SPY. If quotes received table 500 is filtered by selecting only the rows from the interest table 400 that contain symbols from stock symbol 402, the resulting table can be the filtered quotes table 600 that only contains rows with stock symbol 602 that match contents of stock symbol 402.

It will be appreciated that more than one column from an interest table can be used to filter a data source.

It will also be appreciated that a variety of filtering logic can be used in conjunction with the interest table. Selection based on values found in or not found in the interest table are two examples. Other examples include, but are not limited to, applying one or more formulas, less than or equal to and/or greater than or equal qualifiers.

Figure 7:
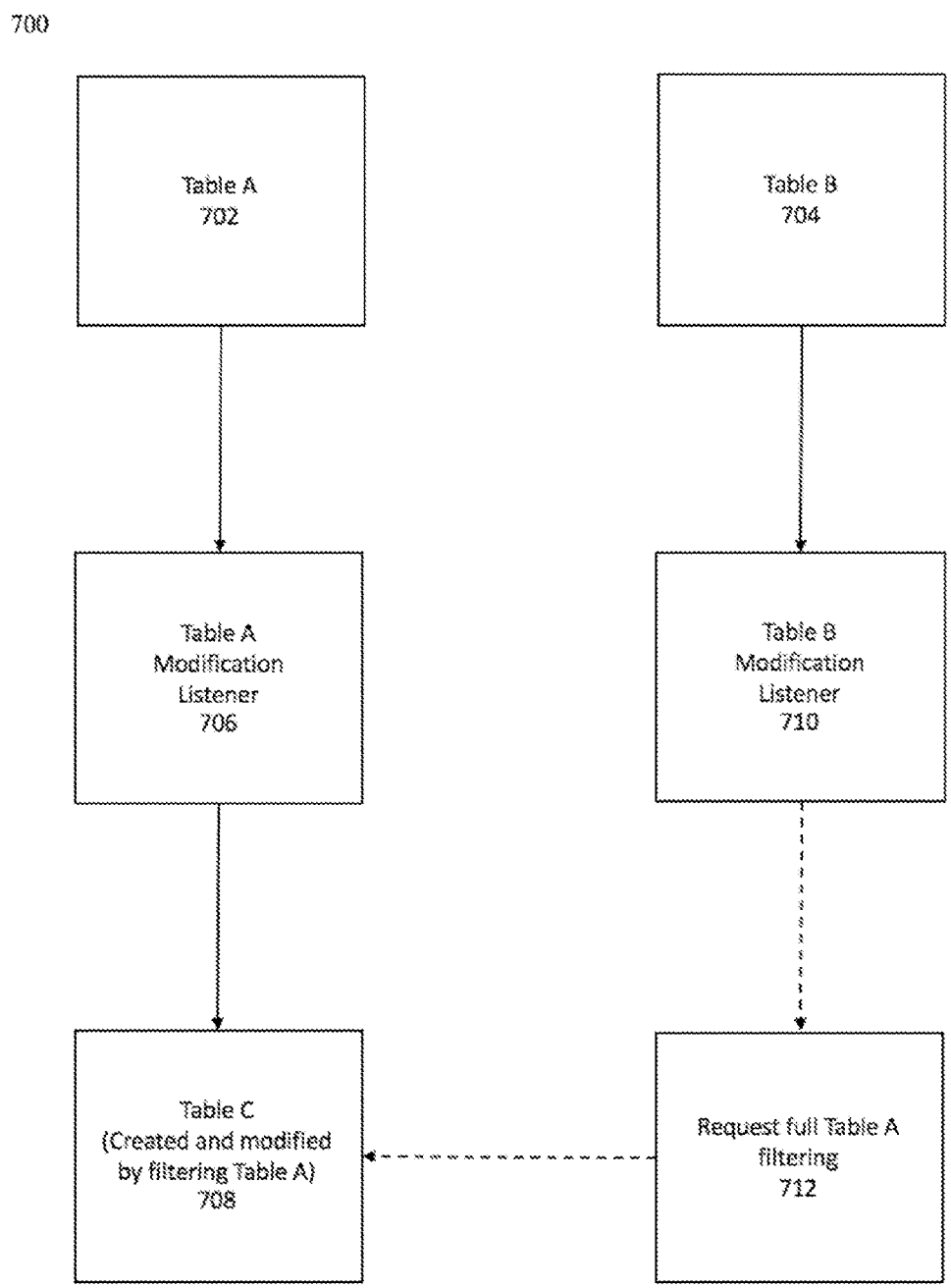
FIG. 7 is a flowchart of an example dynamic filtering operation in accordance with some implementations.

FIG. 7 is a flowchart of an example flow of a dynamic filtering operation 700 using an interest data source and a data source in accordance with some implementations. The components of the example dynamic filtering operation 700 can be a ticking table A 702, a ticking table B 704, a table A modification listener 706, a table B modification listener 710, a filtered results table C 708, and a request to perform a full filtering of table A 712 to update table C 708.

Ticking tables such as table A 702 and table B 704 can be data sources that are changing frequently or that can change. For example, changes can occur due to an addition of one or more rows, a modification to one or more existing rows, deletion of one or more rows, or re-indexing. Re-indexing can be the same data but with different row locations. An example of table A can be the quotes received table 500. An example of table B can be the interest table 400.

It will be appreciated that changes that can occur to data sources are not limited to an addition of one or more rows, a modification to one or more existing rows, deletion of one or more rows, or re-indexing. For example, changes such as column additions, column deletions, column merges, row merges, or the like can occur.

It will be appreciated that table A 702 and table B 704 can change asynchronously. For example, table A 702 can be a table that adds new rows every microsecond, second, minute, hour, day or the like. Table B 704 can be a table that never or rarely adds, modifies, or deletes rows. The changes to table A 702 can be made independent of changes to table B 704 and the changes to table B 704 can be made independent of the changes to table A 702.

Table modification listeners such as table A modification listener 706 and table B modification listener 710 can be a software construct associated with a changing data source that can listen for events or changes that can occur in a changing data source. Examples of events or changes can include an addition of one or more rows to a table, a modification of one or more rows of a table, a deletion of one or more rows of a table, or a re-indexing of the rows of a table. A modification listener (706, 710) can trigger filtering to occur after an event or change is detected by the modification listener (706, 710).

Filtered data source results such as table C 708 can be a filtered result of table A. An example of table C can be the filtered quotes table 600. Table C can be formed by an example command such as table_C=table_A.DynamicFilteringOperation (table_B, "interest column"). The DynamicFilteringOperation portion of the command can alert a compiler or an interpreter that the filter will remain dynamic through the life of table C. The table B portion of the command can alert a compiler or an interpreter that table B will provide the filtering by designation of the table B filtering column or columns, "interest column."

It will be appreciated that an example command such as table_C=table_A NotInDynamicFilteringOperation (table_B, "interest column") can create a resultant table C that does not contain rows that contain any of the items designated in the table B interest column.

It will also be appreciated that a formula or formulas can be substituted for interest column or columns.

FIG. 7 demonstrates example flow possibilities for updating a table C that has already been created from the filtering of table A at least once with a table B through the application of an DynamicFilteringOperation command in accordance with some implementations. As part of the application of the DynamicFilteringOperation command, listeners 706, 710 for input to table A 702 and table B 704 can be configured to listen for any changes to table A 702 and table B 704 respectively, in order to determine when, where, and how to apply the dynamic filter operation.

Listener 706 can continuously listen for changes to table A 702. If the listener 706 detects a change to table A 702 through either an addition of one or more rows, a deletion of one or more rows, a modification of one or more rows, or a re-indexing of table A 702, the listener 706 can trigger a re-filtering of table C 708 for only those rows affected by the addition, deletion, modification or re-indexing.

It will be appreciated that changes that can be detected by the listener are not limited to an addition of one or more rows, a modification to one or more existing rows, deletion of one or more rows, or re-indexing. For example, changes such as column additions, column deletions, column merges, row merges, or the like can be detected.

Listener 710 can continuously listen for messages containing changes to table B 704. If listener 710 does not detect a message regarding an addition of one or more rows, a deletion of one or more rows, or a modification of one or more rows, re-indexing or other message types in table B 704, listener 710 does not take any action toward re-filtering table C 708. If listener 710 detects an addition of one or more rows, a deletion of one or more rows, or a modification of one or more rows, re-indexing, or other message types in table B 704, listener 710 can initiate a request for full table filtering 712 of table A 702, which causes table C 708 to be updated to reflect the new interest set in table B 704. The updated table C 708 can then send a notification message of the changes to any downstream listeners for children created from operations on table C. This can be an equivalent replacement of table C without the table C object being deleted and recreated. The listener 710 can also maintain additional state to prevent re-filtering when modifications to table B 704 does not result in a new interest set, for example, adding and removing rows with duplicate values.

It will be appreciated that filtering on only changed table A 702 rows and only completing a full filtering of table A 702 when table B 704 changes can provide a significant system efficiency savings for large tables or large data sources.

It will be appreciated that a DynamicFilteringOperation can be implemented with constructs other than listeners, such as any construct that can monitor events such as an addition of one or more rows, a deletion of one or more rows, a modification of one or more rows, or re-indexing in a table or other data source.

It will also be appreciated that a DynamicFilteringOperation can be executed in a remote query processor application 310 but is not limited to being executed in a remote processor application.

Figure 8:
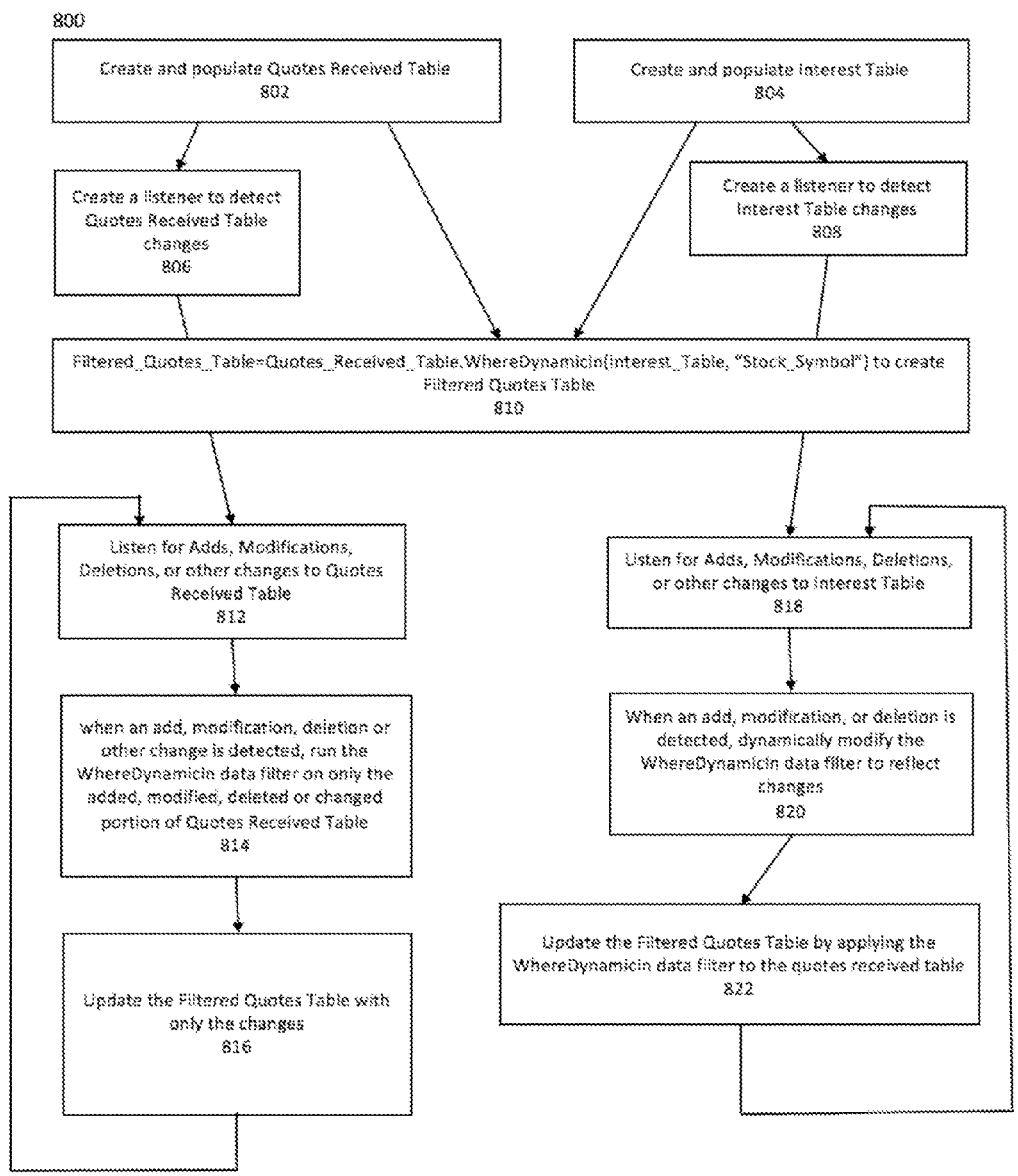
FIG. 8 is a flowchart of an example dynamic filtering operation in accordance with some implementations.

FIG. 8 is a diagram of an example dynamic filtering operation 800 using the example tables from FIGS. 4, 5, and 6 in accordance with some implementations. Processing begins at 802, when a quotes received table 500 is created and populated with data. Alternatively, processing can begin at 804 with the creation and populating of an interest table 400. The quotes received table 500 and the interest table 400 can also be created and populated simultaneously. Processing continues to 806 and 808.

It will be appreciated that a dynamic filtering operation can be executed in a remote query processor application 310 but is not limited to being executed in a remote processor application.

At 806, a listener is created to detect changes to the quotes received table 500. Changes that can occur to the quotes received table 500 include an addition of rows, a deletion of rows, a modification of row content, or a re-indexing of rows.

It will be appreciated that changes that can be detected by the listener are not limited to an addition of one or more rows, a modification to one or more existing rows, deletion of one or more rows, or re-indexing. For example, changes such as column additions, column deletions, column merges, row merges, or the like can be detected.

At 808, a listener is created to detect messages containing changes to the interest table 400. Examples of messages of changes that can occur to the interest table 400 include an addition of rows, a deletion of rows, a modification of row content, a re-indexing, or other message types. It will be appreciated that the creation of the listener 806, 808, follows the creation of the associated table, respectively quotes received table 500 and interest table 400. Accordingly, whether listener 806 precedes the creation of listener 808 or whether listener 808 precedes the creation of listener 806 or whether listener 808 and listener 806 are created simultaneously depends on the timing of the creation of the quotes received table 500 and the interest table 400. Processing continues to 810.

At 810, the filtered quotes table 600 can be created by executing the following example dynamic filtering operation command: Filtered_Quotes_Table=Quotes_Received_Table.WhereDynamicIn (Interest_Table, "Stock_Symbol"). The execution of the dynamic filtering operation command also configures the listeners (806, 808) to trigger an update to the filtered quotes table (600) for a change detected to the quotes received table 500 and to trigger a full filtering of the quotes received table 500 causing a full update of the filtered quotes table 600 for a change detected to the interest table 400. Processing continues to 812.

It will be appreciated that 812 and 818 and their connected next steps can be run in parallel or asynchronously. For clarity of process, steps 812 through 816 are addressed first before returning to 818.

At 812, the listener detects whether one or more rows have been added, modified, deleted or re-indexed in the quotes received table 500. Processing continues to 814.

At 814, when the listener detects the addition, modification, deletion or other change, the listener triggers the execution of the dynamic filtering command on only the added, modified, deleted, or changed portion of the quotes received table 500. Processing continues to 816.

At 816, the filtered quotes table 600 is updated with only the changes made to the quotes received table 500. For example, if a new row for AAPL has been added to the quotes received table 500, then the dynamic filter is executed on that row. The filtered quotes table 600 is updated with the new AAPL row because AAPL is also found in the interest table 400. In another example, if a new row for CMI has been added to the quotes received table 500, then the dynamic filter is executed on that row. But the filtered quotes table 600 is not updated with the new CMI row because CMI is not found in the interest table 400. Process returns to 812.

At 812, the process from 812 to 816 will continue to loop as long as the dynamic filter command remains active. Continue discussion of flowchart at 818.

At 818, the listener created in 810 listens for the addition of one or more rows, the modification of one or more rows, the deletion of one or more rows, or other changes to the interest table 400. Processing continues to 820.

At 820, if the listener detects the addition, modification, deletion or other change that can result in a change to the interest set, the listener triggers the execution of the dynamic filtering operation command on the entirety of the quotes received table 500. For example, if CMI is added to the interest table, then the entire quotes received table 500 will be filtered on AAPL, CMI, and SPY to pick up all the CMI rows that were not previously part of the filtered quotes table 600.

It will be appreciated that in some cases, the system may not need to apply the change to the entirety of the table, thus avoiding the need to re-compute the entirety of the filter operation. For example, if the interest table only had one row removed, the system can update only the removed element rather than re-compute the whole table. Processing continues to 822.

At 822, the filtered quotes table is updated by applying the dynamic filtering to the entirety of the quotes received table. Process returns to 818.

At 818, the process from 818 to 822 will continue to loop as long as the dynamic filtering operation command remains active.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC), a field programmable gate array (FPGA), graphics processing unit (GPU), or the like. The instructions can be compiled from source code instructions provided in accordance with a programming language such as Java, C, C++, C#.net, assembly or the like. The instructions can also comprise code and data objects provided in accordance with, for example, the Visual Basic™ language, a specialized database query language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, or the like.

It is, therefore, apparent that there is provided, in accordance with the various embodiments disclosed herein, methods, systems and computer readable media for dynamic filter operations.

Application Ser. No. 15/154,974, entitled "DATA PARTITIONING AND ORDERING" and filed in the United States Patent and Trademark Office on May 14, 2016, is hereby incorporated by reference herein in its entirety as if fully set forth herein.

Application Ser. No. 15/154,975, entitled "COMPUTER DATA SYSTEM DATA SOURCE REFRESHING USING AN UPDATE PROPAGATION GRAPH" and filed in the United States Patent and Trademark Office on May 14, 2016, is hereby incorporated by reference herein in its entirety as if fully set forth herein.

Application Ser. No. 15/154,979, entitled "COMPUTER DATA SYSTEM POSITION-INDEX MAPPING" and filed in the United States Patent and Trademark Office on May 14, 2016, is hereby incorporated by reference herein in its entirety as if fully set forth herein.

Application Ser. No. 15/154,980, entitled "SYSTEM PERFORMANCE LOGGING OF COMPLEX REMOTE QUERY PROCESSOR QUERY OPERATIONS" and filed in the United States Patent and Trademark Office on May 14, 2016, is hereby incorporated by reference herein in its entirety as if fully set forth herein.

Application Ser. No. 15/154,983, entitled "DISTRIBUTED AND OPTIMIZED GARBAGE COLLECTION OF REMOTE AND EXPORTED TABLE HANDLE LINKS TO UPDATE PROPAGATION GRAPH NODES" and filed in the United States Patent and Trademark Office on May 14, 2016, is hereby incorporated by reference herein in its entirety as if fully set forth herein.

Application Ser. No. 15/154,984, entitled "COMPUTER DATA SYSTEM CURRENT ROW POSITION QUERY LANGUAGE CONSTRUCT AND ARRAY PROCESSING QUERY LANGUAGE CONSTRUCTS" and filed in the United States Patent and Trademark Office on May 14, 2016, is hereby incorporated by reference herein in its entirety as if fully set forth herein.

Application Ser. No. 15/154,985, entitled "PARSING AND COMPILING DATA SYSTEM QUERIES" and filed in the United States Patent and Trademark Office on May 14, 2016, is hereby incorporated by reference herein in its entirety as if fully set forth herein.

Application Ser. No. 15/154,987, entitled "DYNAMIC FILTER PROCESSING" and filed in the United States Patent and Trademark Office on May 14, 2016, is hereby incorporated by reference herein in its entirety as if fully set forth herein.

Application Ser. No. 15/154,988, entitled "DYNAMIC JOIN PROCESSING USING REAL-TIME MERGED NOTIFICATION LISTENER" and filed in the United States Patent and Trademark Office on May 14, 2016, is hereby incorporated by reference herein in its entirety as if fully set forth herein.

Application Ser. No. 15/154,990, entitled "DYNAMIC TABLE INDEX MAPPING" and filed in the United States Patent and Trademark Office on May 14, 2016, is hereby incorporated by reference herein in its entirety as if fully set forth herein.

Application Ser. No. 15/154,991, entitled "QUERY TASK PROCESSING BASED ON MEMORY ALLOCATION AND PERFORMANCE CRITERIA" and filed in the United States Patent and Trademark Office on May 14, 2016, is hereby incorporated by reference herein in its entirety as if fully set forth herein.

Application Ser. No. 15/154,993, entitled "A MEMORY-EFFICIENT COMPUTER SYSTEM FOR DYNAMIC UPDATING OF JOIN PROCESSING" and filed in the United States Patent and Trademark Office on May 14, 2016, is hereby incorporated by reference herein in its entirety as if fully set forth herein.

Application Ser. No. 15/154,995, entitled "QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/154,996, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application Ser. No. 15/154,997, entitled "DYNAMIC UPDATING OF QUERY RESULT DISPLAYS" and filed in the United States Patent and Trademark Office on May 14, 2016, is hereby incorporated by reference herein in its entirety as if fully set forth herein.

Application Ser. No. 15/154,998, entitled "DYNAMIC CODE LOADING" and filed in the United States Patent and Trademark Office on May 14, 2016, is hereby incorporated by reference herein in its entirety as if fully set forth herein.

Application Ser. No. 15/154,999, entitled "IMPORTATION, PRESENTATION, AND PERSISTENT STORAGE OF DATA" and filed in the United States Patent and Trademark Office on May 14, 2016, is hereby incorporated by reference herein in its entirety as if fully set forth herein.

Application Ser. No. 15/155,001, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application Ser. No. 15/155,005, entitled "PERSISTENT QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/155,006, entitled "SINGLE INPUT GRAPHICAL USER INTERFACE CONTROL ELEMENT AND METHOD" and filed in the United States Patent and Trademark Office on May 14, 2016, is hereby incorporated by reference herein in its entirety as if fully set forth herein.

Application Ser. No. 15/155,007, entitled "GRAPHICAL USER INTERFACE DISPLAY EFFECTS FOR A COMPUTER DISPLAY SCREEN" and filed in the United States Patent and Trademark Office on May 14, 2016, is hereby incorporated by reference herein in its entirety as if fully set forth herein.

Application Ser. No. 15/155,009, entitled "COMPUTER ASSISTED COMPLETION OF HYPERLINK COMMAND SEGMENTS" and filed in the United States Patent and Trademark Office on May 14, 2016, is hereby incorporated by reference herein in its entirety as if fully set forth herein.

Application Ser. No. 15/155,010, entitled "HISTORICAL DATA REPLAY UTILIZING A COMPUTER SYSTEM" and filed in the United States Patent and Trademark Office on May 14, 2016, is hereby incorporated by reference herein in its entirety as if fully set forth herein.

Application Ser. No. 15/155,011, entitled "DATA STORE ACCESS PERMISSION SYSTEM WITH INTERLEAVED APPLICATION OF DEFERRED ACCESS CONTROL FILTERS" and filed in the United States Patent and Trademark Office on May 14, 2016, is hereby incorporated by reference herein in its entirety as if fully set forth herein.

Application Ser. No. 15/155,012, entitled "REMOTE DATA OBJECT PUBLISHING/SUBSCRIBING SYSTEM HAVING A MULTICAST KEY-VALUE PROTOCOL" and filed in the United States Patent and Trademark Office on May 14, 2016, is hereby incorporated by reference herein in its entirety as if fully set forth herein.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A system for automatically updating data source objects, the system comprising:
   one or more hardware processors;
   a computer readable data storage device coupled to the one or more hardware processors, the computer readable data storage device having stored thereon software instructions that, when executed by the one or more hardware processors, cause the one or more hardware processors to perform operations including:

creating a first data source object in a first memory;

mapping the first data source object to a first stored data;

creating a second data source object in a second memory; the second data source object different than the first data source object;

mapping the second data source object to a second stored data;

creating a third data source object in a third memory, the third data source object different than the first data source object and the second data source object;

mapping the third data source object to a first subset of the first stored data by filtering the first stored data mapped to the first data source object with the second stored data mapped to the second data source object;

creating a first listener for the third data source object in a fourth memory;

listening with the first listener for one or more changes to the first data source object;

making one or more changes to the first data source object;

detecting by the first listener-of one or more changes to the first data source object;

receiving a notification from the first listener of a change to the first data source object;

updating the mapping of the third data source object by applying the one or more changes to the first data source object;

creating a second listener for the second data source object in a fifth memory;

listening with the second listener for one or more changes to the second data source object;

making one or more changes to the second data source object;

detecting by the second listener of one or more changes to the second data source object;

receiving a notification of one or more changes to the second data source object;

requesting a remapping of the third data source object to a second subset of first stored data by filtering the first stored data mapped to the first data source object with the second stored data mapped to the second data source object; and updating the mapping of the third data source object to a subset of first stored data by filtering the first stored data mapped to the first data source object with the second stored data mapped to the second data source object.

2. The system of claim 1, wherein the mapping the third data source object to a first subset of the first stored data by filtering the first stored data mapped to the first data source object with the second stored data mapped to the second data source object includes selecting a set of rows from the first stored data with one or more key values that are present in the second stored data.

3. The system of claim 1, wherein the mapping the third data source object to a first subset of the first stored data by filtering the first stored data mapped to the first data source object with the second stored data mapped to the second data source object includes selecting a set of rows form the first stored data with one or more key values that are not present in the second stored data.

4. The system of claim 1, the operations further comprising:

determining whether to request a remapping of the third data source object to a second subset of first stored data by filtering the first stored data mapped to the first data source object with the second stored data mapped to the second data source object, the determination based on whether the one or more changes to the second data source object effected an overall change in the second data source;

wherein the updating the mapping of the third data source object to a subset of first stored data by filtering the first stored data mapped to the first data source object with the second stored data mapped to the second data source object is performed only when the one or more changes to the second data source object effected an overall change in the second data source.

5. The system of claim 1, wherein the change to the first data source object includes at least re-indexing the rows of the first data source object.

6. The system of claim 1, wherein a change to the second data source object includes at least one of:

adding a row to the second data source object;

deleting a row from the second data source object;

changing the data in a row of the second data source object; and re-indexing the rows of the second data source object.

7. The system of claim 1, wherein the first memory, the second memory, the third memory, the fourth memory, and the fifth memory are all different.

8. The system of claim 1, the operations further comprising:

sending a notification message of changes to the third data source object to any downstream listeners of one or more children created from operations on the third data source object.

9. The system of claim 1, wherein the remapping includes remapping of the third data source object to a second subset of first stored data by full data filtering the first stored data mapped to the first data source object with the second stored data mapped to the second data source object; and wherein the first data source object is different than the second data source object.

10. A method for using a computer system to automatically update data source objects, the method comprising:

creating, by a processor, a first data source object in a first memory;

mapping the first data source object to a first stored data;

creating a second data source object in a second memory;

mapping the second data source object to a second stored data;

creating a third data source object in a third memory;

mapping the third data source object to a first subset of the first stored data by filtering the first stored data mapped to the first data source object with the second stored data mapped to the second data source object;

creating a first listener for the third data source object in a fourth memory;

listening with the first listener for one or more changes to the first data source object;

making one or more changes to the first data source object;

detecting by the first listener of one or more changes to the first data source object;

receiving a notification from the first listener of the change to the first data source object;

updating the mapping of the third data source object by applying the one or more changes to the first data source object;

creating a second listener for the second data source object in a fifth memory;

listening with the second listener for one or more changes to the second data source object;

making one or more changes to the second data source object;

detecting by the second listener of one or more changes to the second data source object;

receiving a notification of one or more changes to the second data source object;

requesting a remapping of the third data source object to a second subset of first stored data by filtering the first stored data mapped to the first data source object with the second stored data mapped to the second data source object; and updating the mapping of the third data source object to a subset of first stored data by filtering the first stored data mapped to the first data source object with the second stored data mapped to the second data source object.

11. The method of claim 10, wherein the mapping the third data source object to a first subset of the first stored data by filtering the first stored data mapped to the first data source object with the second stored data mapped to the second data source object includes selecting a set of rows from the first stored data with one or more key values that are present in the second stored data.

12. The method of claim 10, wherein the mapping the third data source object to a first subset of the first stored data by filtering the first stored data mapped to the first data source object with the second stored data mapped to the second data source object includes selecting a set of rows form the first stored data with one or more key values that are not present in the second stored data.

13. The method of claim 10, further comprising:
determining whether to request a remapping of the third data source object to a second subset of first stored data by filtering the first stored data mapped to the first data source object with the second stored data mapped to the second data source object, the determination based on whether the one or more changes to the second data source object effected an overall change in the second data source;

wherein the updating the mapping of the third data source object to a subset of first stored data by filtering the first stored data mapped to the first data source object with the second stored data mapped to the second data source object is performed only when the one or more changes to the second data source object effected an overall change in the second data source.

14. The method of claim 10, wherein a change to the first data source object includes at least
re-indexing the rows of the first data source object.

15. The method of claim 10, wherein a change to the second data source object includes at least one of:
adding a row to the second data source object;
deleting a row from the second data source object;
changing the data in a row of the second data source object; and
re-indexing the rows of the second data source object.

16. The method of claim 10, wherein the first memory, the second memory, the third memory, the fourth memory, and the fifth memory are all different.

17. The method of claim 10, further comprising:
sending a notification message of changes to the third data source object to any downstream listeners of one or more children created from operations on the third data source object.

18. The method of claim 10, the operations further comprising:
wherein the remapping includes remapping of the third data source object to a second subset of first stored data by full data filtering the first stored data mapped to the first data source object with the second stored data mapped to the second data source object; and
wherein the first data source object is different than the second data source object.

19. A non-transitory computer readable medium having stored thereon software instructions that, when executed by one or more processors, cause the one or more processors to perform operations including:
creating a first data source object in a first memory;
mapping the first data source object to a first stored data;
creating a second data source object in a second memory;
mapping the second data source object to a second stored data;
creating a third data source object in a third memory;
mapping the third data source object to a first subset of the first stored data by filtering the first stored data mapped to the first data source object with the second stored data mapped to the second data source object;
creating a first listener for the third data source object in a fourth memory;
listening with the first listener for one or more changes to the first data source object;
making one or more changes to the first data source object;
detecting by the first listener of one or more changes to the first data source object;
receiving a notification from the first listener of the change to the first data source object;
updating the mapping of the third data source object by applying the one or more changes to the first data source object;
creating a second listener for the second data source object in a fifth memory;
listening with the second listener for one or more changes to the second data source object;
making one or more changes to the second data source object;
detecting by the second listener of one or more changes to the second data source object;
receiving a notification of one or more changes to the second data source object;
requesting a remapping of the third data source object to a second subset of first stored data by filtering the first stored data mapped to the first data source object with the second stored data mapped to the second data source object; and
updating the mapping of the third data source object to a subset of first stored data by filtering the first stored data mapped to the first data source object with the second stored data mapped to the second data source object.

20. The non-transitory computer readable medium of claim 19, wherein mapping the third data source object to a first subset of the first stored data by filtering the first stored data mapped to the first data source object with the second stored data mapped to the second data source object includes selecting a set of rows from the first stored data with one or more key values that are present in the second stored data.

21. The non-transitory computer readable medium of claim 19, the operations further comprising:
   determining whether to request a remapping of the third data source object to a second subset of first stored data by filtering the first stored data mapped to the first data source object with the second stored data mapped to the second data source object, the determination based on whether the one or more changes to the second data source object effected an overall change in the second data source;
   wherein the updating the mapping of the third data source object to a subset of first stored data by filtering the first stored data mapped to the first data source object with the second stored data mapped to the second data source object is performed only when the one or more changes to the second data source object effected an overall change in the second data source.

22. The non-transitory computer readable medium of claim 19, wherein a change to the first data source object includes at least
   re-indexing the rows of the first data source object.

23. The non-transitory computer readable medium of claim 19, wherein a change to the second data source object includes at least one of:
   adding a row to the second data source object;
   deleting a row from the second data source object;
   changing the data in a row of the second data source object; and
   re-indexing the rows of the second data source object.

24. The non-transitory computer readable medium of claim 19, wherein the first memory, the second memory, the third memory, the fourth memory, and the fifth memory are all different.

25. The non-transitory computer readable medium of claim 19, the operations further comprising:
   sending a notification message of changes to the third data source object to any downstream listeners of one or more children created from operations on the third data source object.

26. The non-transitory computer readable medium of claim 19, the operations further comprising:
   wherein the remapping includes remapping of the third data source object to a second subset of first stored data by full data filtering the first stored data mapped to the first data source object with the second stored data mapped to the second data source object; and
   wherein the first data source object is different than the second data source object.

\* \* \* \* \*

UNITED STATES PATENT AND TRADEMARK OFFICE
CERTIFICATE OF CORRECTION

PATENT NO. : 9,672,238 B2
APPLICATION NO. : 15/154987
DATED : June 6, 2017
INVENTOR(S) : Charles Wright et al.

It is certified that error appears in the above-identified patent and that said Letters Patent is hereby corrected as shown below:

In the Claims

In Column 17, Line 23, Claim 1, delete "listener-of" and insert --listener of--

Signed and Sealed this
Twenty-fourth Day of July, 2018

Andrei Iancu
*Director of the United States Patent and Trademark Office*